(12) United States Patent
Moteki et al.

(10) Patent No.: US 10,438,412 B2
(45) Date of Patent: Oct. 8, 2019

(54) TECHNIQUES TO FACILITATE ACCURATE REAL AND VIRTUAL OBJECT POSITIONING IN DISPLAYED SCENES

(71) Applicant: FUJITSU LIMITED, Kawasaki-shi, Kanagawa (JP)

(72) Inventors: Atsunori Moteki, Kawasaki (JP); Nobuyasu Yamaguchi, Kawasaki (JP); Toshiyuki Yoshitake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 15/492,587

(22) Filed: Apr. 20, 2017

(65) Prior Publication Data

US 2017/0316612 A1 Nov. 2, 2017

(30) Foreign Application Priority Data

Apr. 28, 2016 (JP) .................................. 2016-092066

(51) Int. Cl.
*G06T 19/00* (2011.01)
*G06T 7/73* (2017.01)
*G06T 15/20* (2011.01)
*G06T 19/20* (2011.01)

(52) U.S. Cl.
CPC .............. *G06T 19/006* (2013.01); *G06T 7/73* (2017.01); *G06T 15/20* (2013.01); *G06T 19/20* (2013.01); *G06T 2219/2016* (2013.01)

(58) Field of Classification Search
None
See application file for complete search history.

(56) References Cited

U.S. PATENT DOCUMENTS

| 9,191,238 B2 | 11/2015 | Douris et al. |
| 2009/0110241 A1 | 4/2009 | Takemoto et al. |
| 2012/0131435 A1 | 5/2012 | Douris et al. |
| 2012/0210255 A1 | 8/2012 | Ooi et al. |

(Continued)

FOREIGN PATENT DOCUMENTS

| JP | 2009-110304 | 5/2009 |
| JP | 2011-8687 | 1/2011 |

(Continued)

OTHER PUBLICATIONS

Mulloni et al.; "User Friendly SLAM Initialization;" IEEE International Symposium on Mixed and Augmented Reality 2013; Science and Technology Proceedings, Oct. 1-4, 2013, Adelaide, SA, Australia; pp. 153-162.*

(Continued)

*Primary Examiner* — Edward Martello
(74) *Attorney, Agent, or Firm* — Xsensus LLP

(57) ABSTRACT

A method includes specifying a position of a virtual object based on a position of a map point that is defined in a first map and indicates three-dimensional coordinates of a feature point, correcting the position of the virtual object based on positions of a plurality of map points defined in a second map and a capturing direction of a camera when the first map is changed to the second map that is different from the first map, and controlling a display to display the virtual object, based on the corrected position of the virtual object and an image captured by the camera.

17 Claims, 22 Drawing Sheets

(56) References Cited

U.S. PATENT DOCUMENTS

2014/0327792 A1* 11/2014 Mulloni .................... G06T 7/73
                                                                348/211.8
2015/0302649 A1    10/2015 Komatsu
2016/0267707 A1*   9/2016 Vesely .................... G06T 15/20

FOREIGN PATENT DOCUMENTS

| JP | 2012-168798 | 9/2012 |
|----|-------------|--------|
| JP | 2015-207219 | 11/2015 |

OTHER PUBLICATIONS

Extended European Search Report dated Sep. 29, 2017 in Patent Application No. 17167720.6.
Gerhard Reitmayr, "Semi-automatic Annotations in Unknown Environments", 6th IEEE and ACM International Symposium on Mixed and Augmented Reality, XP031269876, 2007, pp. 1-4.
Georg Klein, et al. "Parallel Tracking and Mapping for Small AR Workspaces", 6th IEEE and ACM International Symposium on Mixed and Augmented Reality, XP058089591, 2007, pp. 1-10.
Stefan Maass, et al. "Dynamic Annotation of Interactive Environments using Object-Integrated Billboards", WSCG '2006, XP055071946, 2006, pp. 1-8.
Richard I. Hartley, et al. "Triangulation", Computer Vision and Image Understanding, vol. 68, No. 2, XP055407514, 1997, pp. 146-157.

* cited by examiner

FIG. 2

| KEYFRAME NUMBER | CAMERA POSE | CAMERA IMAGE | FEATURE POINT GROUP [pixel] | MAP POINT ID |
|---|---|---|---|---|
| 1 | (0.24, 0.84, 0.96, 245.0, 313.9, 23.8) | (24, 46, ⋯) | (11, 42), (29, 110), (178, 90), (242, 310), ⋯ | 3, 5, 9, 32, ⋯ |
| 2 | (0.15, 0.90, 0.23, 93.3, 163.0, 73.2) | (25, 44, ⋯) | (92, 32), (41, 88), (201, 11), (231, 290), ⋯ | 2, 11, 43, 51, ⋯ |
| 3 | (0.64, 0.45, 0.12, 132.8, 77.3, 61.8) | (22, 40, ⋯) | (13, 27), (32, 38), (42, 103), (83, 55), ⋯ | 4, 7, 28, 37, ⋯ |
| ⋯ | ⋯ | ⋯ | ⋯ | ⋯ |
| 25 | (0.54, 0.80, 0.92, 398.2, 310.2, 29.0) | (134, 89, ⋯) | (55, 120), (173, 193), (103, 167), (236, 262), ⋯ | 32, 35, 58, 62 ⋯ |

| MAP POINT ID | X [mm] | Y [mm] | Z [mm] | FEATURE DESCRIPTOR |
|---|---|---|---|---|
| 1 | 126 | 59 | 329 | (0.264, ⋯) |
| 2 | 314 | 193 | 289 | (0.822, …) |
| 3 | 212 | 49 | 315 | (0.652, …) |
| … | … | … | … | … |
| 68 | -237 | -21 | 291 | (0.740, …) |

| OBJECT NUMBER | CG IMAGE | COORDINATES BEFORE CORRECTION | COORDINATES AFTER CORRECTION |
|---|---|---|---|
| 1 | aa.bmp | (15.3, 21.8, 0.0) | (16.5, 20.7, 9.3) |
| 2 | bb.bmp | (25.2, 73.2, 0.0) | (27.1, 73.6, 5.3) |

124

TECHNIQUES TO FACILITATE ACCURATE REAL AND VIRTUAL OBJECT POSITIONING IN DISPLAYED SCENES

CROSS-REFERENCE TO RELATED APPLICATION

This application is based upon and claims the benefit of priority of the prior Japanese Patent Application No. 2016-092066, filed on Apr. 28, 2016, the entire contents of which are incorporated herein by reference.

FIELD

The embodiments discussed herein are related to authoring processing in augmented reality (AR).

BACKGROUND

Augmented reality (AR) technology is used for the purpose of supporting a field worker or the like by an operator in a remote place. AR technology is a technology with which a camera image and a virtual object selected by an operator are superimposed and displayed on a screen of a terminal used by a worker. For example, in the case where an object to which an attention is desired to be given is projected in a camera image, an operator arranges a virtual object for encouraging a worker to pay attention to the object to which an attention is desired to be given and causes the virtual object to be superimposed on the object and displayed, and the worker refers to the virtual object and thus is able to distinguish the object to which an attention is to be given. Examples 1 and 2 of the related art are described below as examples of the related art in which a virtual object is superimposed and displayed.

Example 1 of the related art describes a technique in which the shape of a target object is identified and, when the target object is specified by a user, a virtual object is arranged in accordance with the shape of the specified target object. Example 2 of the related art describes a technique in which a virtual object is arranged in a position on a screen which is touched by a user and it is assumed that the three-dimensional coordinates of the virtual object exist on a line of sight.

Examples of the related art are described, for example, in Japanese Laid-open Patent Publication No. 2011-008687 and Japanese Laid-open Patent Publication No. 2009-110304.

SUMMARY

According to an aspect of the invention, a method includes specifying a position of a virtual object based on a position of a map point that is defined in a first map and indicates three-dimensional coordinates of a feature point, correcting the position of the virtual object based on positions of a plurality of map points defined in a second map and a capturing direction of a camera when the first map is changed to the second map that is different from the first map, and controlling a display to display the virtual object, based on the corrected position of the virtual object and an image captured by the camera.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an exemplary data structure of keyframe information;

FIG. 4 is a table illustrating an exemplary data structure of map information;

FIG. 9 is a table illustrating an exemplary data structure of virtual object information;

DESCRIPTION OF EMBODIMENTS

The above-described examples of the related art have a problem in which, in the case where the position of a camera moves, it is difficult to reduce the occurrence of displacement of a display position of a virtual object.

Figure 22:
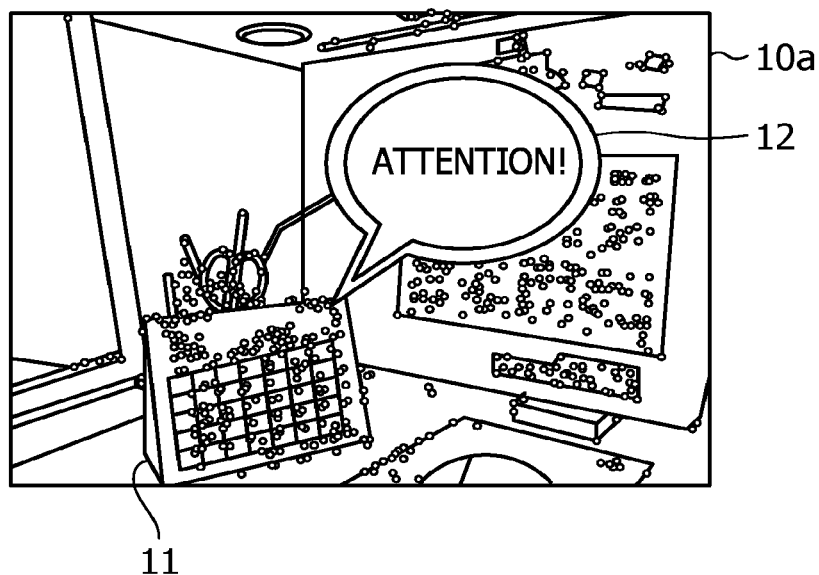
FIG. 22 is a view for describing a problem of the related art.
Figure 22:
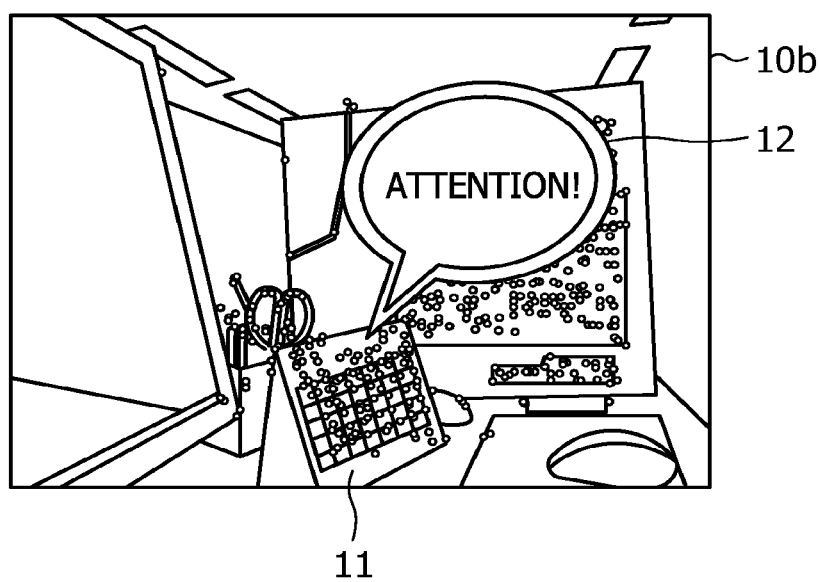

FIG. 22 is a view for describing a problem of the related art. In FIG. 22, an image 10a is an image photographed by the camera and an image 10b is an image photographed, after the image 10a was photographed, in a position different from the position of the camera in which the image 10a was photographed.

For example, when an operator or the like specifies an edge of a target object 11 of the image 10a, the target object 11 and a virtual object 12 are associated with each other and the virtual object 12 is superimposed and displayed in a specified position. However, when the position of the camera moves and the image 10b is displayed, the virtual object 12 is superimposed and displayed in the state of being displaced in a position different from a position intended by the operator.

In one aspect, the present disclosure aims to provide an authoring device, an authoring method, and an authoring program which may reduce the occurrence of displacement of a display position of a virtual object.

Embodiments of an authoring device, an authoring method, and an authoring program disclosed herein are described in detail below with reference to the accompanying drawings. Note that the present disclosure is not limited to the embodiments described below.

[Embodiment 1]

Figure 1:
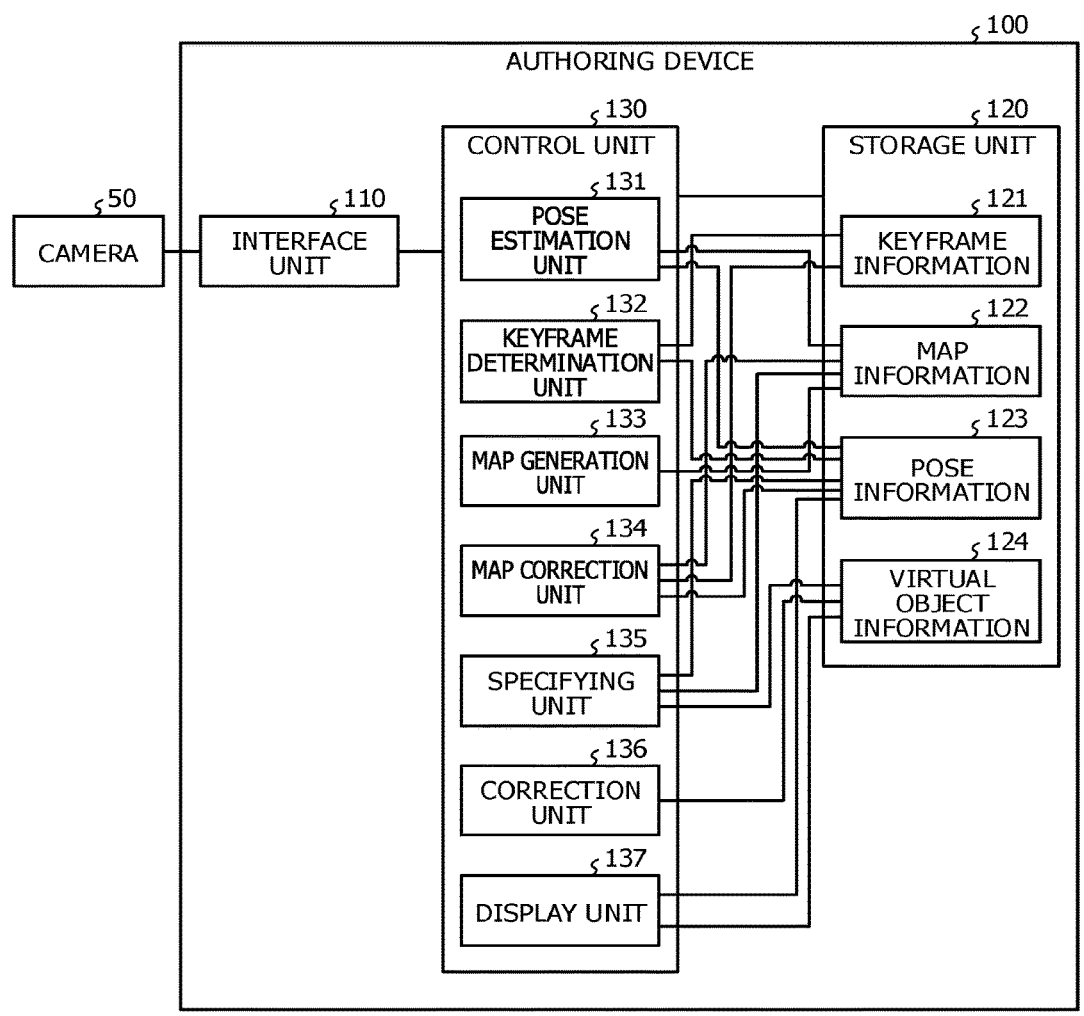
FIG. 1 is a functional block diagram illustrating a configuration of an authoring device according to Embodiment 1.

FIG. 1 is a functional block diagram illustrating a configuration of an authoring device according to Embodiment 1. As illustrated in FIG. 1, an authoring device 100 is coupled to a camera 50. The authoring device 100 includes an interface unit 110, a storage unit 120, and a control unit 130.

The camera 50 is a device that photographs an image in a photographing range and outputs data of the photographed image to the authoring device 100. In the following description, data of an image photographed by the camera 50 is described as image data. For example, each time the camera 50 photographs an image, the camera 50 outputs image data to the authoring device 100. Also, the camera 50 transmits the image data to a terminal device of an operator, which is not illustrated, via a network or the like.

The interface unit 110 is coupled to the camera 50. Each time the interface unit 110 acquires image data from the camera 50, the interface unit 110 outputs the acquired image data to the control unit 130. Although illustrating is omitted, the interface unit 110 is coupled to an input device and a display device. Also, the interface unit 110 may be configured to execute data communication with a terminal device of the operator via the network.

The storage unit 120 includes keyframe information 121, map information 122, pose information 123, and virtual object information 124. The storage unit 120 corresponds to, for example, a semiconductor memory device, such as random access memory (RAM), read only memory (ROM), flash memory, or the like, or a storage device, such as a hard disk, an optical disk, or the like.

The keyframe information 121 includes information about the pose of the camera 50 at the time when a keyframe was photographed and information about a feature point included in the keyframe. In this case, the keyframe is data of an image that was photographed by the camera 50 and satisfies a predetermined condition.

FIG. 2 is a table illustrating an exemplary data structure of keyframe information. As illustrated in FIG. 2, the keyframe information 121 includes a keyframe number, camera pose, a camera image, a feature point group, and a map point ID. The keyframe number is a number that uniquely identifies a keyframe. The camera pose is information indicating the position and attribute of the camera 50.

Figure 3:
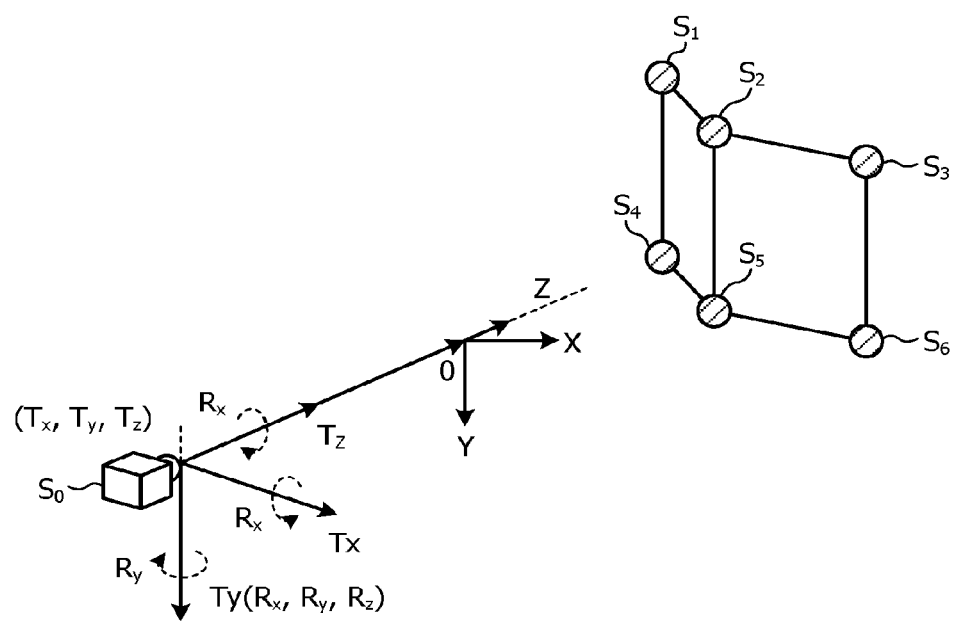
FIG. 3 is a view for describing a definition of a camera coordinate system.

FIG. 3 is a view for describing a definition of a camera coordinate system. The optical axis direction of the camera 50 is a Z axis, directions perpendicular to the Z axis are an X axis and a Y axis, and the origin of a coordinate system is 0. The pose of the camera includes six dimensions of a translation component T (Tx, Ty, Tz) from the origin 0 of the coordinate system and a rotation component R (Rx, Ry, Rz). The values of the camera pose illustrated in FIG. 2 correspond to Tx, Ty, Tz, Rx, Ry, and Rz.

Return to the description of FIG. 2. The camera image represents image data that has been determined as a keyframe. The feature point group indicates coordinates of each feature point included in the keyframe. The map point identification (ID) is information that uniquely identifies a map point that corresponds to each feature point of the feature point group. The map point corresponds to three-dimensional coordinates of a feature point and is defined by the map information 122, which is described later. For example, the map points correspond to $S_1$ to $S_6$ illustrated in FIG. 3. Note that the map points are not limited to $S_1$ to $S_6$.

The map information 122 holds information related to the map points. FIG. 4 is a table illustrating an exemplary data structure of map information. As illustrated in FIG. 4, the map information 122 associates the map point ID, a coordinate on the X axis, a coordinate on the Y axis, a coordinate on the Z axis, and a feature descriptor with one another. The map point ID is information that uniquely identifies the map point. The coordinate on the X axis, the coordinate on the Y axis, and the coordinate on the Z axis correspond to three-dimensional coordinates of the map point. As the feature descriptor, values of peripheral pixels around a feature point on the keyframe, which corresponds to the map point, are arranged in a predetermined order.

Return to the description of FIG. 1. The pose information 123 indicates, for example, information about the current pose of the camera 50.

The pose of the camera 50 includes six dimensions of the translation component T (Tx, Ty, Tz) and the rotation component R (Rx, Ry, Rz). Note that the pose information 123 may be information about a time and the pose of the camera 50 at the time associated with each other.

The virtual object information 124 holds information about the three-dimensional coordinates of a virtual object that is arranged by the operator. Also the virtual object information 124 may be configured to have information about an image that corresponds to the virtual object. A data structure of the virtual object information 124 is described later.

The control unit 130 includes a pose estimation unit 131, a keyframe determination unit 132, a map generation unit 133, a map correction unit 134, a specifying unit 135, a correction unit 136, and a display unit 137. The control unit 130 corresponds to an integrated device, such as, for example, an application specific integrated circuit (ASIC), a field programmable gate array (FPGA), or the like. Also, the control unit 130 corresponds to an electronic circuit, such as, for example, a CPU, a micro processing unit (MPU), or the like.

The pose estimation unit 131 is a processing unit that estimates the pose of the camera 50. The pose estimation unit 131 registers information about the estimated pose in the pose information 123. For example, the pose estimation unit 131 executes feature point detection processing, matching processing, and pose estimation processing, which are described below, in order.

Exemplary feature point detection processing that is executed by the pose estimation unit 131 is described. The pose estimation unit 131 detects a feature point from image data, based on that a pixel intensity fluctuation near a point to be noted is large and the position of the point to be noted on an image is uniquely defined by the pixel intensity fluctuation. In many cases, the feature point corresponds to a corner of a target object.

Exemplary matching processing that is executed by the pose estimation unit 131 is described. The pose estimation unit 131 is a processing unit that performs matching of a feature point of image data and a projection point in which a map point of the map information 122 is projected on the image data.

Figure 5:
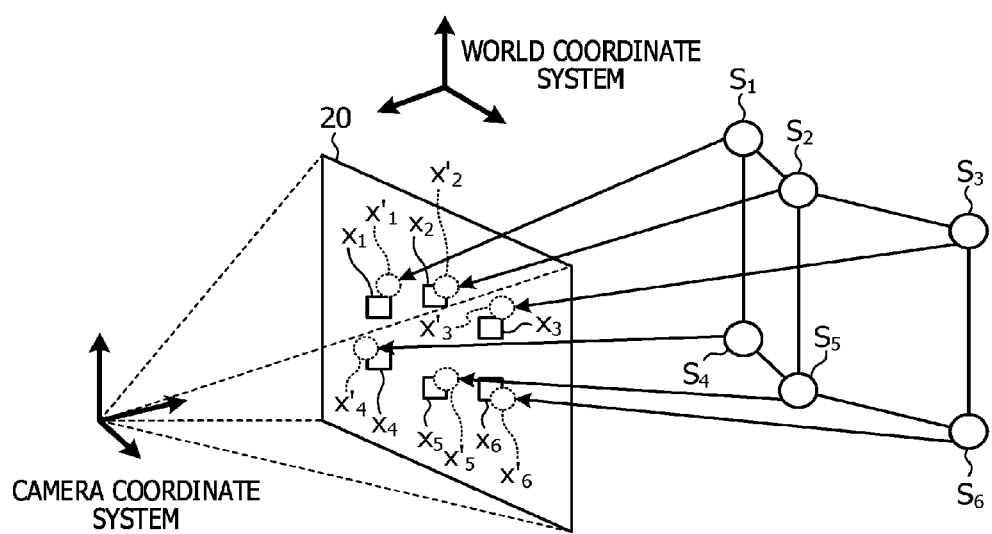
FIG. 5 is a view for describing matching processing.

FIG. 5 is a view for describing matching processing. As illustrated in FIG. 5, it is assumed that map points $S_1$ to $S_6$ exist. A map point $S_1$ is in a world coordinate system and is expressed by Expression 1. It is assumed that feature points $x_1$ to $x_6$ exist on image data 20. A feature point $x_i$ is in a camera coordinate system and is expressed by Expression 2. Map points projected on the image data 20 are projection points $x_1'$ to $x_6'$. A projection point $x_i'$ is in the camera coordinate system and is expressed by Expression 3.

$$S_i = (x, y, z) \tag{1}$$

$$x_i = (u, v) \tag{2}$$

$$x_i' = (u', v') \tag{3}$$

In FIG. 5, for example, assuming that a distance between the feature point $x_1$ and the projection point $x_1'$ is short and image features are similar, the pose estimation unit 131 generates feature point and map point pair information in which the feature point $x_1$ and the map point $S_1$ are made as a pair. The pose estimation unit 131 repetitively executes the above-described processing on other feature points and other projection points to determine a pair of a feature point and a map point and add the determined pair to the feature point and map point pair information.

Exemplary pose estimation processing that is executed by the pose estimation unit 131 is described. Based on Expression 4, the pose estimation unit 131 searches for the translation component T and the rotation component R of the camera 50 with which the sum E of differences between the feature point $x_i$ and the projection point $x_i'$ of the map point, which has been made as a pair, is the smallest, and calculates the pose of the camera 50. As described above, the translation component T of the camera 50 is T (Tx, Ty, Tz) and the rotation component R of the camera 50 is R(Rx, Ry, Rz).

$$E = \sum_p |x_p' - x_p|^2 \tag{4}$$

The keyframe determination unit 132 is a processing unit that determines whether or not data of an image photographed by the camera 50 is a keyframe that satisfies a condition that is used for generating the map information 122. The keyframe determination unit 132 executes first keyframe determination processing or second keyframe determination processing, which is described later. The keyframe determination unit 132 is an example of the determination unit.

The first keyframe determination processing is described. The keyframe determination unit 132 performs the first keyframe determination processing in a stage before the pose estimation unit 131 estimates the pose of the camera 50. The keyframe determination unit 132 acquires image data from the interface unit 110, compares immediately preceding image data and current image data to each other, and determines whether or not the movement of the camera 50 is small. In the case where the movement of the camera 50 is small, the keyframe determination unit 132 determines that the current image data is a keyframe.

The keyframe determination unit 132 executes movement tracking using optical flow, alignment using pattern matching, or the like to determine whether or not the movement of the camera 50 is small. For example, in the case where a difference between the position of a target object that exists in the immediately preceding image data and the position of a target object that exists in the current image data is less than a threshold, the keyframe determination unit 132 determines that the movement of the camera 50 is small.

The second keyframe determination processing is described. The keyframe determination unit 132 performs the second keyframe determination processing in a stage after the pose estimation unit 131 has estimated the pose of the camera 50. The keyframe determination unit 132 acquires information $T_t$ of the position of the camera 50 that photographed image data at a time tn from the pose information 123. Also, the keyframe determination unit 132 acquires from the keyframe information 121 information $T_{kf}$ of the pose of the camera 50 that photographed a preceding keyframe.

The keyframe determination unit 132 compares the information $T_t$ of the position and the information $T_{kf}$ of the pose and, in the case where a distance between the information $T_t$ of the position and the information $T_{kf}$ of the pose is equal to or more than a threshold, the keyframe determination unit 132 determines the image data at the time tn as a keyframe. The keyframe determination unit 132 registers information about the keyframe in the keyframe information 121.

The map generation unit 133 is a processing unit that generates initial map information 122. For example, based on the position of a feature point that exists in a single keyframe, the map generation unit 133 arranges a map point on a plane located at a reference distance from the camera 50, thereby generating the initial map information 122.

Figure 6:
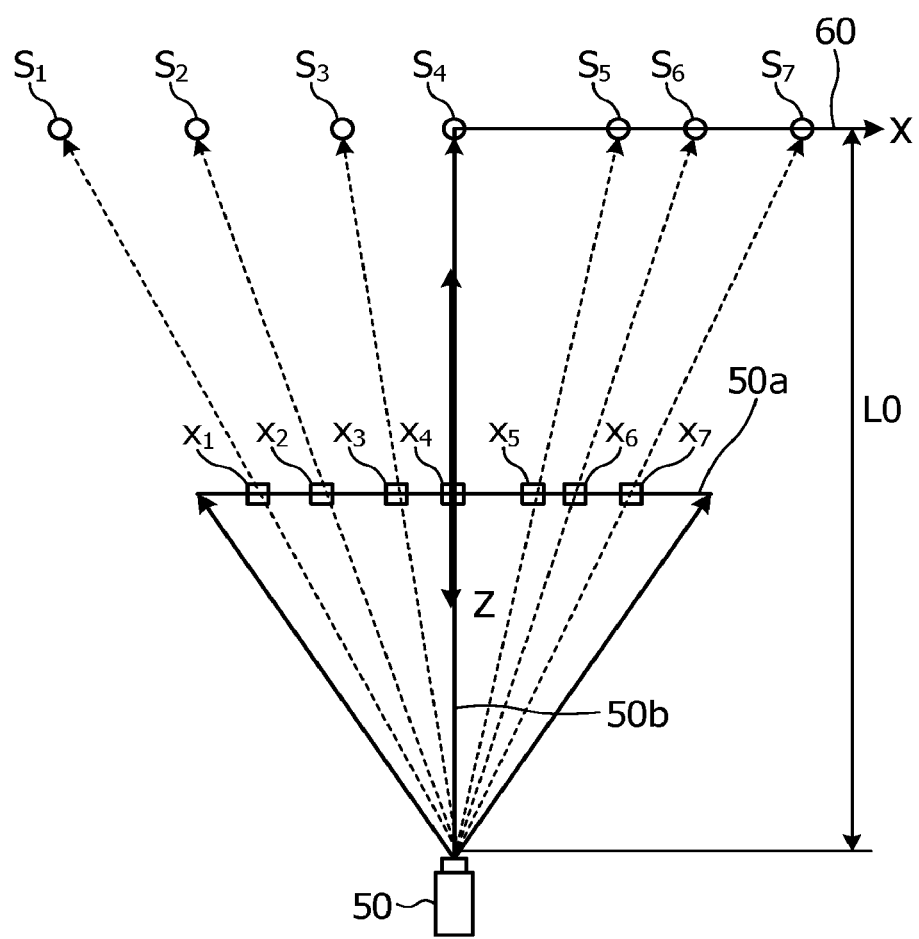
FIG. 6 is a view for describing processing of generating initial map information.

FIG. 6 is a view for describing processing of generating initial map information. FIG. 6 is a schematic view, seen from the Y axis direction of the world coordinates. The map generation unit 133 defines a world coordinate system in which the center of image data is the origin, the horizontal direction of the image data is the X axis, the vertical direction of the image data is the Y axis, and a photographing direction 50b of the camera 50 from the origin is the Z axis. In the example illustrated in FIG. 6, the intersection of the photographing direction 50b of the camera 50 and the X axis is the origin of the world coordinate system.

A distance along the Z axis from the origin to the camera 50 is fixed to a reference distance L0 that has been set in advance. The translation component T of the camera 50 in the world coordinate system is (0, 0, L0) and the rotation component R thereof is an identity matrix.

In FIG. 6, as an example, it is assumed that feature points $x_1$ to $x_7$ were detected on a photographing surface 50a of the camera 50. The map generation unit 133 defines a straight line passing through the camera 50 and a feature point $x_i$, assumes that a map point exists at the intersection of the defined straight line and an XY plane 60 that is perpendicular to the Z axis, and thus, specifies the position of the map point. For example, the map generation unit 133 assumes that a map point $S_1$ exists at the intersection of the XY plane 60 and the straight line passing through the camera 50 and the feature point $x_i$.

The map generation unit 133 executes the above-described processing and thereby specifies the map points $S_1$ to $S_7$ that correspond to the feature points $x_1$ to $x_7$. Respective values of the coordinates of the map points on the Z axis, which have been specified by the map generation unit 133, are all 0. The map generation unit 133 gives a map point ID to each map point and registers in the map information 122 the map point ID, the coordinate on the X axis, the coordinate on the Y axis, the coordinate on the Z axis, and the feature descriptor in association with one another. The map information 122 in which the respective values of the coordinates of the map points on the Z axis are all 0 is described as a plane map, as appropriate.

Also, the map generation unit 133 registers, based on the relationship between the map points of the map information 122 and the keyframes, information about the map point ID into the keyframe information 121.

The map correction unit 134 is a processing unit that corrects the map information 122 by acquiring two viewpoints in which the pose of the camera 50 are known and calculating correct three-dimensional coordinates of the map points. The map correction unit 134 corrects the map information 122, and thereby, an initially generated plane map is made into a stereoscopic map.

Figure 7:
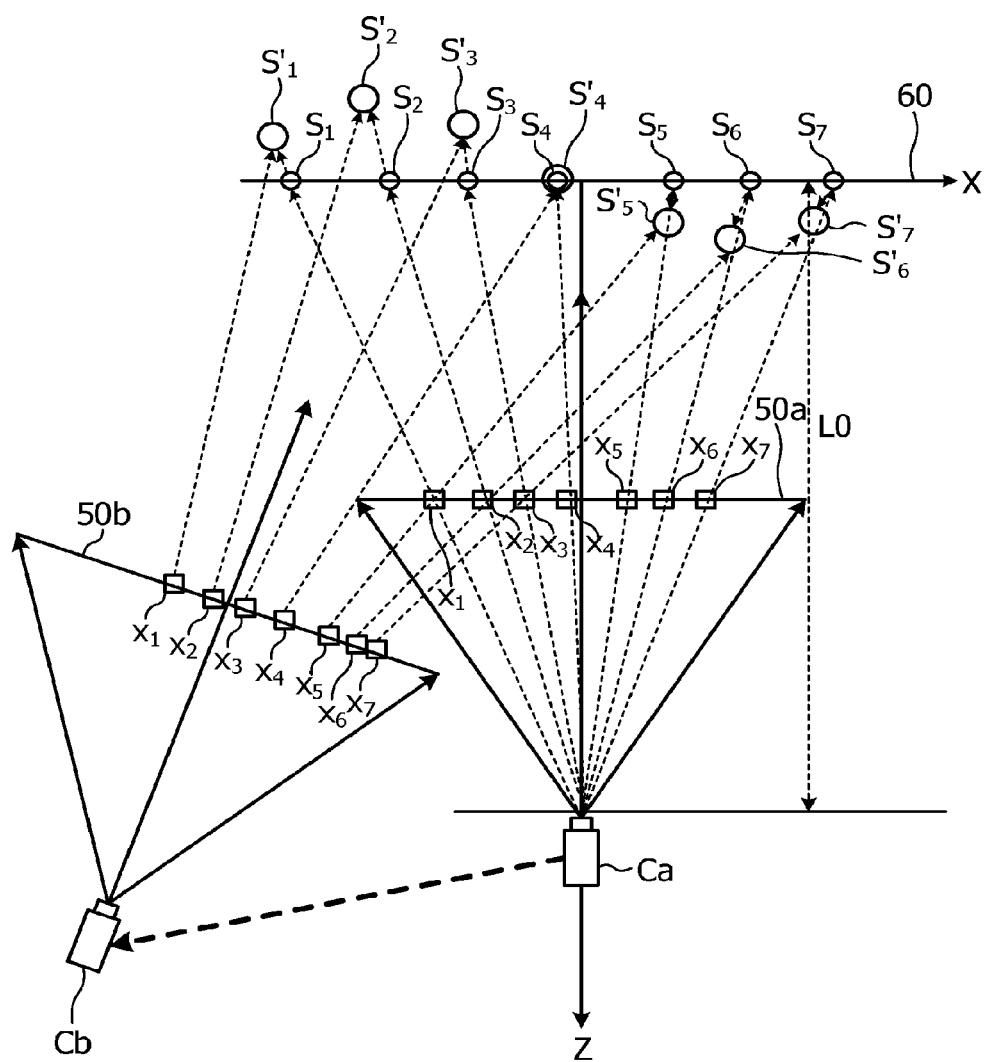
FIG. 7 is a view for describing processing of a map correction unit.

FIG. 7 is a view for describing processing of a map correction unit. For convenience of description, Ca denotes the position of the camera 50 in which the translation component T0 (0, 0, L0) and the rotation component RO (identity matrix) are achieved. Cb denotes the position of the camera 50 to which the camera 50 moves and in which the translation component Tt (Txt, Tyt, Tzt) and the rotation component Rt are achieved. As described above, based on a keyframe photographed by the camera 50 in the pose of the translation component T0 (0, 0, L0) and the rotation component RO (identity matrix), the map generation unit 133 specifies the map points $S_1$ to $S_7$ and generates a plane map.

In this case, it is assumed that the feature points $x_1$ to $x_7$ were detected on a photographing plane (keyframe) 50b which was photographed by the camera 50 in the pose of the translation component Tt (Txt, Tyt, Tzt) and the rotation component Rt. The map correction unit 134 associates the same feature points in two pieces of image data photographed in different photographing positions with each other. For example, the map correction unit 134 associates each of the feature points $x_1$ to $x_7$ of the photographing surface 50a and the corresponding one of the feature points $x_1$ to $x_7$ of the photographing surface 50b.

The map correction unit 134 corrects, after associating feature points, the position of each map point by calculating correct three-dimensional coordinates of map points, based on the principle of stereo photographing. In the example illustrated in FIG. 7, the three-dimensional coordinates of the map points $S_1$ to $S_7$ are corrected to $S_1'$ to $S_7'$, respectively. The map correction unit 134 updates the map information 122 using the three-dimensional coordinates of the map points after correction. The three-dimensional coordinates of the map points are corrected by the map correction unit 134, and thereby, the plane map is made into a stereoscopic map.

In the second and subsequent determinations performed by the above-described keyframe determination unit 132, each time the keyframe determination unit 132 determines that the image data is a keyframe, the map correction unit 134 repetitively executes the above-described processing, and thereby, updates the three-dimensional coordinates (the coordinate on the X axis, the coordinate on the Y axis, and the coordinate on the Z axis) of the map points of the map information 122.

Note that processing in which the map correction unit 134 calculates the three-dimensional coordinates of map points is not limited to the above-described processing and the map correction unit 134 may be configured to calculate the three-dimensional coordinates of a map point using any known technology. For example, the map correction unit 134 may be configured to calculate the three-dimensional coordinates of a map point, based on R. I. Hartley et al., Triangulation, Computer Vision and Image Understanding, vol. 68, No 2, pp. 146-157, 1997.

The specifying unit 135 is a processing unit that specifies, in the case where two-dimensional coordinates ($u_o$, $v_o$) of a virtual object on image data are specified by the operator or the like, the initial three-dimensional coordinates of the virtual object. The specifying unit 135 registers information about the specified three-dimensional coordinates of the virtual object as the virtual object information 124.

Note that the terminal device that is operated by the operator receives image data from the camera 50 via the network or the like and displays the image data on the display device. The operator refers to the image data that is displayed on the terminal device and inputs the two-dimensional coordinates at which the virtual object is arranged to the terminal device. The specifying unit 135 receives the two-dimensional coordinates of the virtual object from the terminal device.

Exemplary processing in which the specifying unit 135 specifies initial three-dimensional coordinates of a virtual object is described. Based on the map information 122, the specifying unit 135 projects the map points on the image data, thereby calculating coordinates (u', v') of a projection point of each map point. The specifying unit 135 compares the two-dimensional coordinates ($u_o$, $v_o$) of the virtual object and the coordinates (u', v') of each projection point and specifies a projection point that is located at the smallest distance from the two-dimensional coordinates ($u_o$, $v_o$).

The specifying unit 135 specifies the three-dimensional coordinates of a map point that corresponds to the specified projection point as initial three-dimensional coordinates of the virtual object. For example, the specifying unit 135 compares the two-dimensional coordinates ($u_o$, $v_o$) of the virtual object and the coordinates (u', v') of each projection point, and a projection point that is located at the smallest distance from the two-dimensional coordinates ($u_o$, $v_o$) is assumed to be a projection point in which the map point $S_1$ is projected on the image data. In this case, the specifying unit 135 specifies the three-dimensional coordinates of the virtual object as the three-dimensional coordinates of the map point $S_1$.

Figure 8:
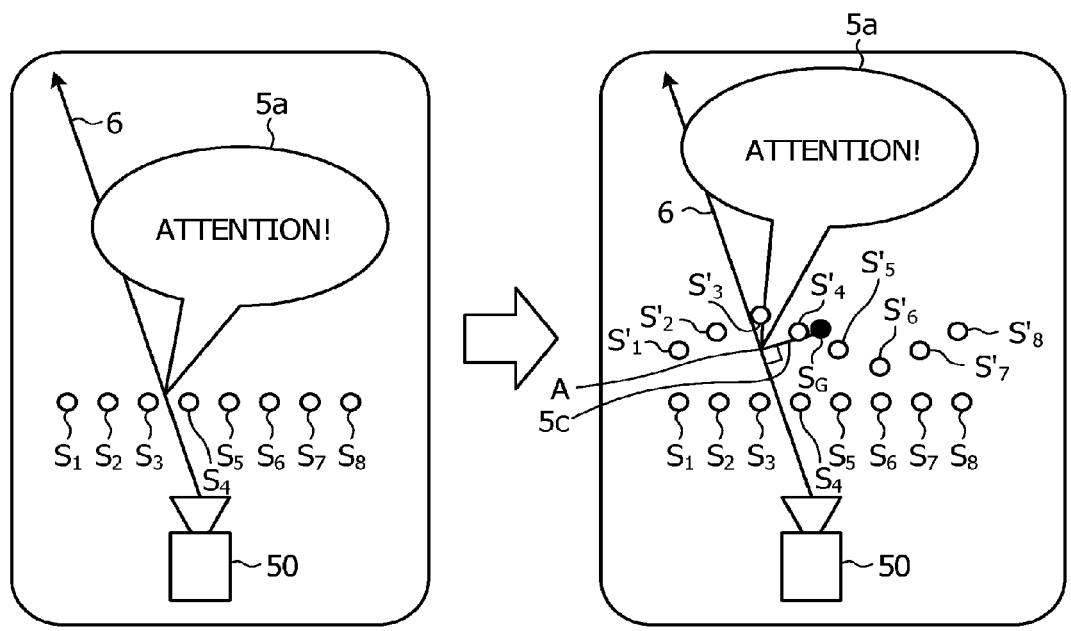
FIG. 8 is a view for describing processing of a correction unit according to Embodiment 1.

The correction unit 136 is a processing unit that corrects, in the case where the map information 122 is changed from a plane map to a stereoscopic map, the three-dimensional coordinates of the virtual object. FIG. 8 is a view for describing processing of a correction unit according to Embodiment 1. In the example illustrated in FIG. 8, a line connecting the position of the camera 50 and the position of a virtual object 5a is a line of sight 6. It is assumed that the virtual object 5a is associated with the map point $S_3$ included in the plane map.

The correction unit 136 calculates, in the case where the map information 122 is changed from a plane map to a stereoscopic map, the center of gravity $S_G$ of each of the map points $S_1'$ to $S_8'$ included in the stereoscopic map. The correction unit 136 calculates three-dimensional coordinates of the foot A of a perpendicular line 5c extending downward from the center of gravity $S_G$ to the line of sight 6 as the three-dimensional coordinates of the virtual object 5a after correction. The correction unit 136 updates the virtual object information 124 using the calculated three-dimensional coordinates of the calculated virtual object 5a (the three-dimensional coordinates of the foot A).

FIG. 9 is a table illustrating an exemplary data structure of virtual object information. As illustrated in FIG. 9, the virtual object information 124 associates an object number, a CG image, coordinates before correction, and coordinates after correction with one another. The object number is information that uniquely identifies a virtual object. The computer graphics (CG) image is information about an image of the virtual object. The coordinates before correction are the initial three-dimensional coordinates of the virtual object, which are specified by the specifying unit 135. The coordinates after correction are the three-dimensional coordinates of the virtual object after correction, which have been corrected by the correction unit 136.

The display unit 137 converts, based on the virtual object information 124 and the pose information 123, the three-dimensional coordinates of the virtual object to two-dimensional coordinates on the image data and arranges the virtual object on the converted two-dimensional coordinates on the image data to generate superimposed image data. The display unit 137 causes the display device, such as a display or the like, to display the superimposed image data.

In the case where the coordinates after correction are registered, the display unit 137 calculates two-dimensional coordinates, based on the coordinates after correction. In the case where the coordinates after correction are not registered, the display unit 137 calculates two-dimensional coordinates, based on an image before correction.

Figure 10:
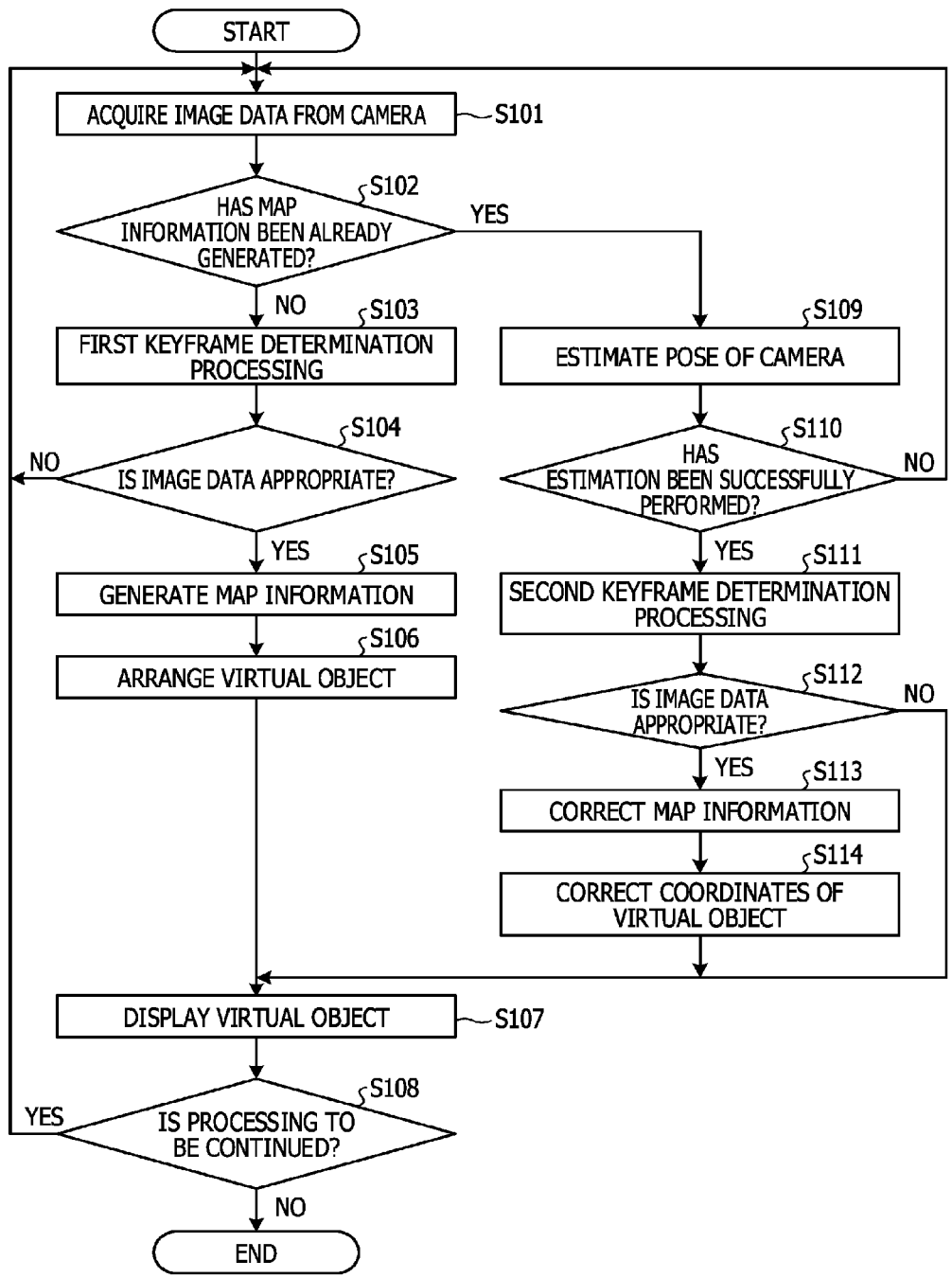
FIG. 10 is a flowchart illustrating processing procedures of an authoring device according to Embodiment 1.

Subsequently, exemplary processing procedures of the authoring device 100 according to Embodiment 1 is described. FIG. 10 is a flowchart illustrating processing procedures of an authoring device according to Embodiment 1. As illustrated in FIG. 10, the authoring device 100 acquires image data from the camera 50 (Step S101).

The authoring device 100 determines whether or not the map information 122 has been already generated (Step S102). In the case where the authoring device 100 determines that the map information has not been generated (NO in Step S102), the keyframe determination unit 132 of the authoring device 100 executes the first keyframe determination processing (Step S103).

The keyframe determination unit 132 determines whether or not the image data is appropriate as a first keyframe (Step S104). In the case where the image data is not appropriate as the first keyframe (NO in Step S104), the keyframe determination unit 132 causes the process to return to Step S101. On the other hand, in the case where the image data is appropriate as the first keyframe (YES in Step S104), the keyframe determination unit 132 causes the process to proceed to Step S105.

The map generation unit 133 of the authoring device 100 generates the map information 122 (Step S105). The specifying unit 135 of the authoring device 100 specifies the coordinates of a virtual object, and the display unit 137 arranges the virtual object (Step S106) and displays the virtual object (Step S107).

In the case where the processing is to be continued (YES in Step S108), the authoring device 100 causes the process to return to Step S101. On the other hand, in the case where the processing is not to be continued (NO in Step S108), the authoring device 100 terminates the processing.

Return to the description of Step S102 of FIG. 10. In the case where the map information 122 has been already generated (YES in Step S102), the authoring device 100 causes the process to proceed to Step S109. The pose estimation unit 131 of the authoring device 100 estimates the pose of the camera 50 (Step S109).

In the case where estimation of the pose has not been successfully performed (NO in Step S110), the pose estimation unit 131 causes the process to return to Step S101. In the case where estimation of the pose has been successfully performed (YES in Step S110), the pose estimation unit 131 causes the process to proceed to Step S111.

The keyframe determination unit 132 of the authoring device 100 executes the second keyframe determination processing (Step S111). In the case where image data is not appropriate as a second keyframe (NO in Step S112), the keyframe determination unit 132 causes the process to proceed to Step S107. On the other hand, in the case where image data is appropriate as the second keyframe (YES in Step S112), the keyframe determination unit 132 causes the process to proceed to Step S113.

The map correction unit 134 of the authoring device 100 corrects the map information 122 (Step S113). The correction unit 136 of the authoring device 100 corrects the coordinates of the virtual object (Step S114) and causes the process to proceed to Step S107.

Next, advantages of the authoring device 100 according to Embodiment 1 are described. In the case where a map of the map information 122 is changed from a plane map to a stereoscopic map, the authoring device 100 corrects the coordinates of the virtual object, based on the stereoscopic map. For example, the correction unit 136 of the authoring device 100 calculates the center of gravity $S_G$ of each of the map points $S_1'$ to $S_8'$ included in the stereoscopic map and calculates the three-dimensional coordinates of the foot A of the perpendicular line 5c extending downward from the center of gravity $S_G$ to the line of sight 6 as three-dimensional coordinate of the virtual object after correction.

For example, when the camera 50 moves and thereby a stereoscopic map is generated, the plane map is changed to the stereoscopic map. In accordance with this change, a positional displacement occurring to the three-dimensional coordinates of the virtual object is corrected to an appropriate position by the correction unit 136, and therefore, displacement of the display position of the virtual object is not caused.

[mbodiment 2]

Figure 11:
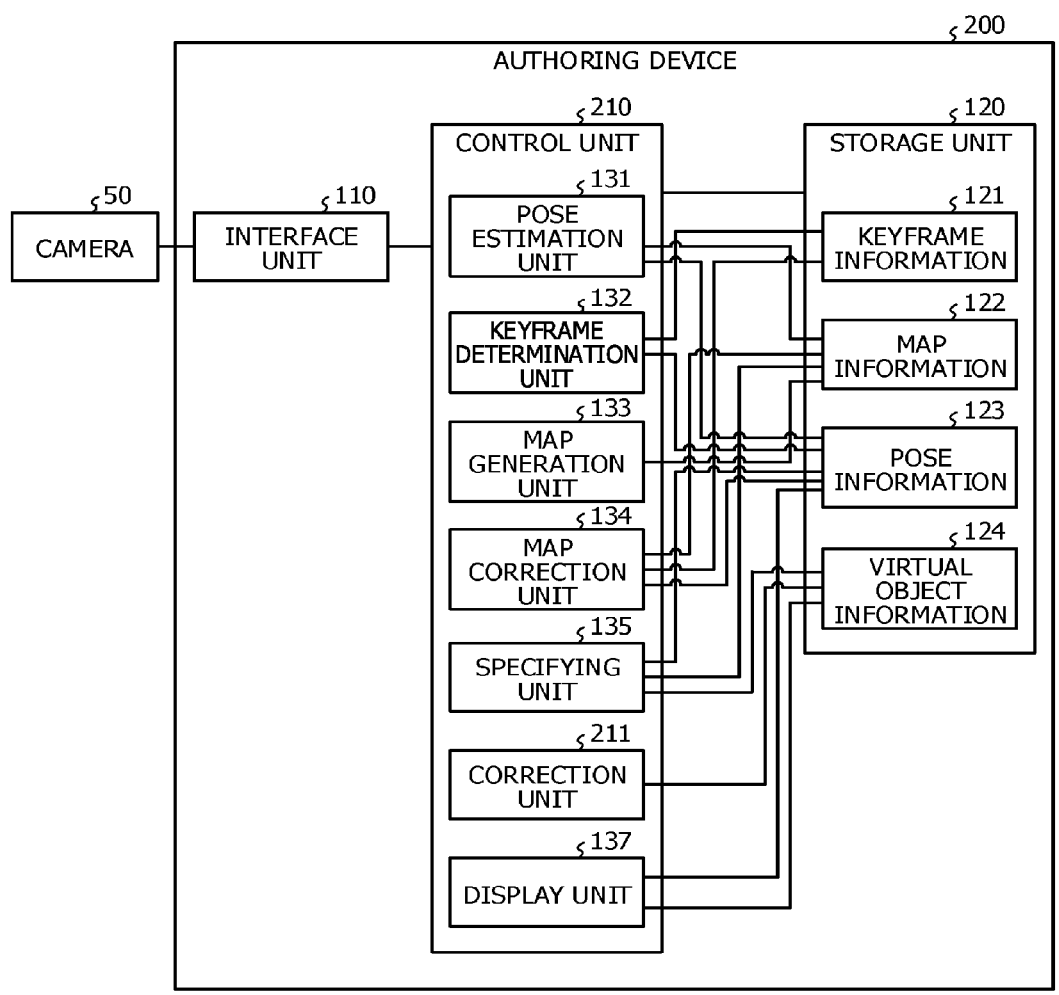
FIG. 11 is a diagram illustrating a configuration of an authoring device according to Embodiment 2.

FIG. 11 is a diagram illustrating a configuration of an authoring device according to Embodiment 2. As illustrated in FIG. 11, an authoring device 200 is coupled to a camera 50. The authoring device 200 includes an interface unit 110, a storage unit 120, and a control unit 210.

Similar description to the description of the camera 50 in Embodiment 1 applies to the camera 50. Also, similar description to the description of each of the interface unit 110 and the storage unit 120 in Embodiment 1 applies to the corresponding one of the interface unit 110 and the storage unit 120.

The control unit 210 includes a pose estimation unit 131, a keyframe determination unit 132, a map generation unit 133, a map correction unit 134, a specifying unit 135, a correction unit 211, and a display unit 137. The control unit 210 corresponds to an integrated device, such as, for example, an ASIC, an FPGA, or the like. Also, the control unit 210 corresponds to an electronic circuit, such as, for example, a CPU, an MPU, or the like.

Similar description to the description of each of the pose estimation unit 131, the keyframe determination unit 132, the map generation unit 133, the map correction unit 134, the specifying unit 135, and the display unit 137 in Embodiment 1 applies to the corresponding one of processing units included in the control unit 210.

In the case where the map information 122 is changed from a plane map to a stereoscopic map, the correction unit 211 calculates an approximate plane of each of the map points $S_1'$ to $S_8'$ included in the stereoscopic map and calculates the coordinates of the intersection of the approximate plane and a line of sight as the three-dimensional coordinates of a virtual object. The correction unit 211 updates the virtual object information 124 using the calculated three-dimensional coordinates of the virtual object. Processing in which the correction unit 211 specifies an approximate plane and processing in which the correction unit 211 calculates the three-dimensional coordinates of the virtual object are described below.

Figure 12:
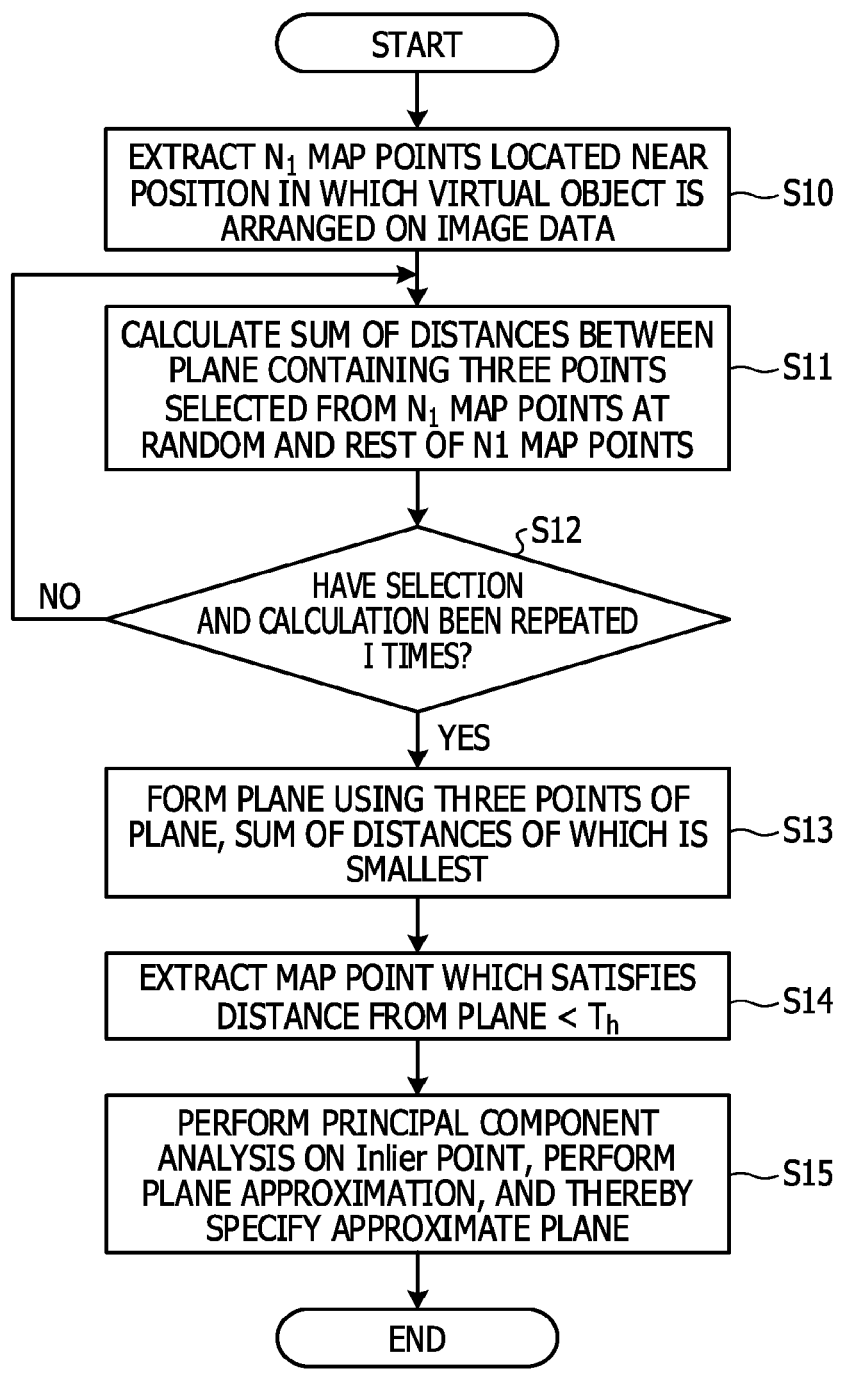
FIG. 12 is a flowchart illustrating processing procedures of identifying an approximate plane.

FIG. 12 is a flowchart illustrating processing procedures of identifying an approximate plane. As illustrated in FIG. 12, the correction unit 211 extracts $N_1$ map points located near the position in which the virtual object is arranged on the image data (Step S10). The correction unit 211 calculates the sum of distances between a plane including three points selected from the $N_1$ map points at random and the rest of the $N_1$ map points (Step S11).

The correction unit 211 determines whether or not the above-described selection and calculation have been repeated I times (Step S12). In the case where the above-described selection and calculation have not been repeated I times (NO in Step S12), the correction unit 211 causes the process to return to Step S11. In the case where the above-described selection and calculation have been repeated I times (YES in Step S12), the correction unit 211 forms a plane using three points of a plane, the sum of the distances of which is the smallest (Step S13).

The correction unit 211 extracts a map point which satisfies the distance from the plane<$T_h$ (Step S14). The map point extracted in Step S14 is described as an Inlier point and other map points than the Inlier point are described as Outlier points. The correction unit 211 specifies an approximate plane by performing principal component analysis on the Inlier point to perform plane approximation (Step S15).

Figure 13:
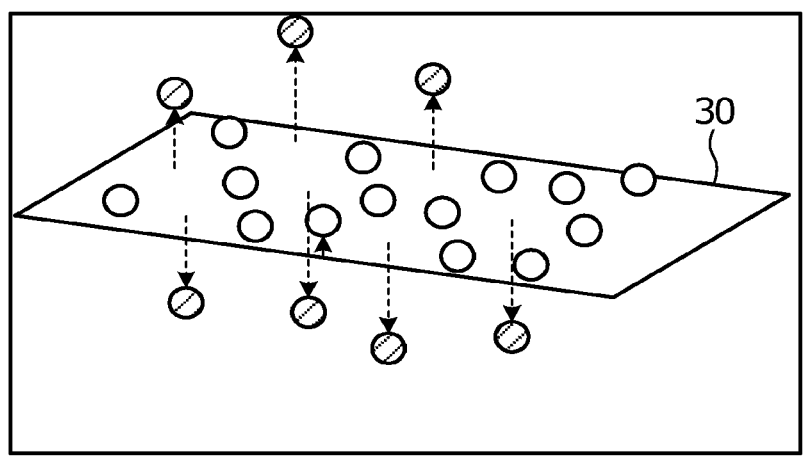
FIG. 13 is a view illustrating an exemplary approximate plane.

FIG. 13 is a view illustrating an exemplary approximate plane. In FIG. 13, the hatched map points are Outlier points. The unhatched map points are Inlier points. An approximate plane 30 is a plane that is obtained by principal component analysis that is performed by the correction unit 211. For example, the correction unit 211 calculates a first component and a second component as vectors by principal component analysis and sets a plane that is obtained by the first component and the second component and also passes through the center of gravity of a neighboring map point as the approximate plane 30.

Figure 14:
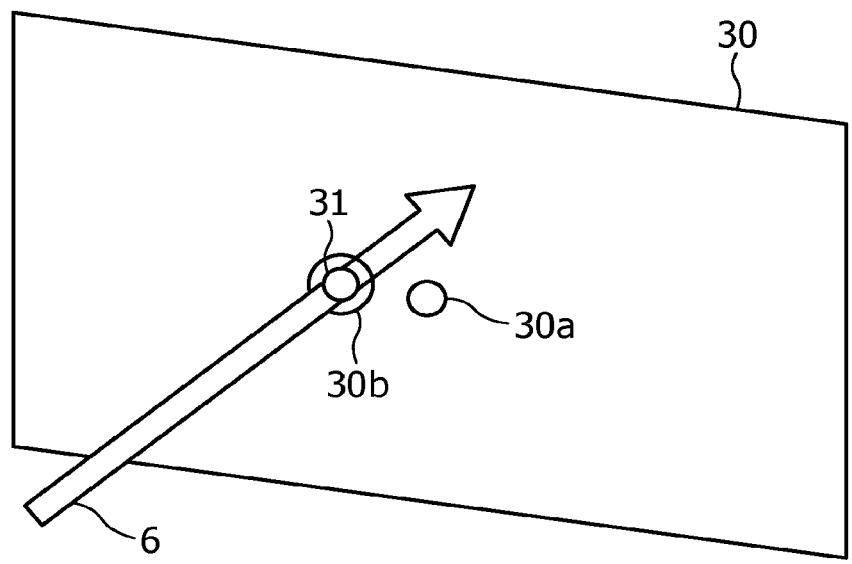
FIG. 14 is a view illustrating exemplary processing in which a correction unit according to Embodiment 2 calculates three-dimensional coordinates of a virtual object.

Subsequently, exemplary processing in which the correction unit 211 calculates the three-dimensional coordinates of the virtual object is described. FIG. 14 is a view illustrating exemplary processing in which a correction unit according to Embodiment 2 calculates three-dimensional coordinates of a virtual object. In FIG. 14, the approximate plane 30 is an approximate plane that is obtained by the processing of FIG. 12. The center of gravity 30a is the center of gravity of the approximate plane. The line of sight 6 is a line connecting the three-dimensional coordinates of the camera 50 and the three-dimensional coordinates of the virtual object before correction.

The correction unit 211 calculates an intersection 31 of the approximate plane 30 and the line of sight 6 as the three-dimensional coordinates of the virtual object after correction. Note that there is a case where, depending on the surrounding structure of a map point, displacement of the position in which the virtual object is arranged occurs. For example, an error range is a range 30b.

Next, advantages of the authoring device 200 according to Embodiment 2 are described. In the case where the map of the map information 122 is changed from a plane map to a stereoscopic map, the authoring device 200 corrects the coordinates of the virtual object, based on the stereoscopic map. For example, the correction unit 211 of the authoring device 200 calculates an approximate plane of each of the map points $S_1'$ to $S_8'$ included in the stereoscopic map and calculates the coordinates of the intersection of the approximate plane and the line of sight as the three-dimensional coordinates of the virtual object.

For example, when the camera 50 moves and thereby a stereoscopic map is generated, the plane map is changed to the stereoscopic map. In accordance with this change, a positional displacement occurring to the three-dimensional coordinates of the virtual object is corrected to an appropriate position by the correction unit 211, and therefore, displacement of the display position of the virtual object is not caused.

[Embodiment 3]

Figure 15:
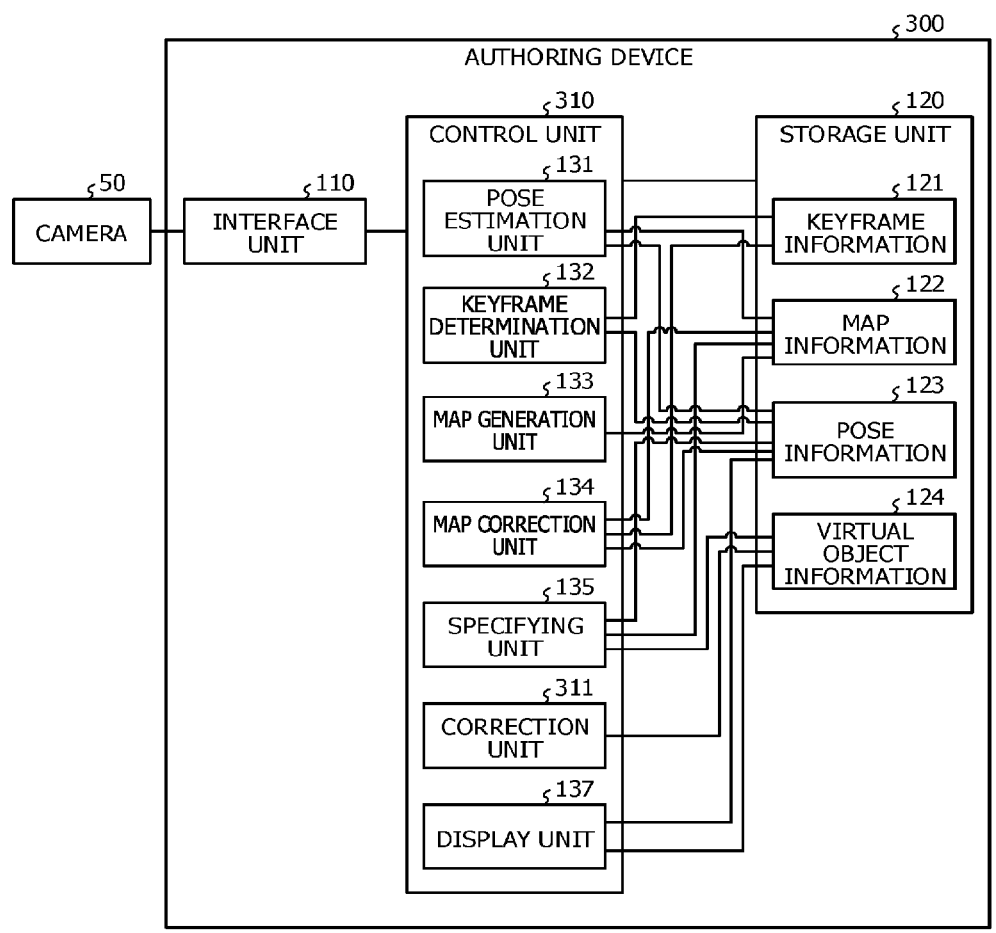
FIG. 15 is a diagram illustrating a configuration of an authoring device according to Embodiment 3.

FIG. 15 is a diagram illustrating a configuration of an authoring device according to Embodiment 3. As illustrated in FIG. 15, an authoring device 300 is coupled to a camera 50. The authoring device 300 includes an interface unit 110, a storage unit 120, and a control unit 310.

Similar description to the description of the camera 50 in Embodiment 1 applies to the camera 50. Also, similar description to the description of each of the interface unit 110 and the storage unit 120 in Embodiment 1 applies to the corresponding one of the interface unit 110 and the storage unit 120.

The control unit 310 includes a pose estimation unit 131, a keyframe determination unit 132, a map generation unit 133, a map correction unit 134, a specifying unit 135, a correction unit 311, and a display unit 137. The control unit 310 corresponds to an integrated circuit, such as, for example, an ASIC, an FPGA, or the like. Also, the control unit 310 corresponds to an electronic circuit, such as, for example, a CPU, an MPU, or the like.

Similar description to the description of each of the pose estimation unit 131, the keyframe determination unit 132, the map generation unit 133, the map correction unit 134, the specifying unit 135, and the display unit 137 in Embodiment 1 applies to the corresponding one of processing units included in the control unit 310.

In the case where the map information 122 is changed from a plane map to a stereoscopic map, the correction unit 311 calculates an approximate plane of each of the map points $S_1'$ to $S_8'$ included in the stereoscopic map. In this case, in accordance with whether or not an angle formed by the line normal to the approximate plane and a line of sight is close to a right angle, the correction unit 311 switches processing of calculating the three-dimensional coordinates of the virtual object. For example, in the case where an absolute value of a difference between the angle formed by the line normal to the approximate plane and the line of sight and 80 degrees is less than a predetermined angle, the correction unit 311 determines that the angle formed by the line normal to the approximate plane and the line of sight is close to a right angle.

Processing of the correction unit 311 in the case where the angle formed by the line normal to the approximate plane and the line of sight is not close to a right angle is described. In this case, the correction unit 311 executes similar processing to the processing of the correction unit 211 which has been described in Embodiment 2, and thereby, calculates the three-dimensional coordinates of the virtual object. That is, the correction unit 311 calculates the coordinates of the intersection of the approximate plane and the line of sight as the three-dimensional coordinates of the virtual object.

Figure 16:
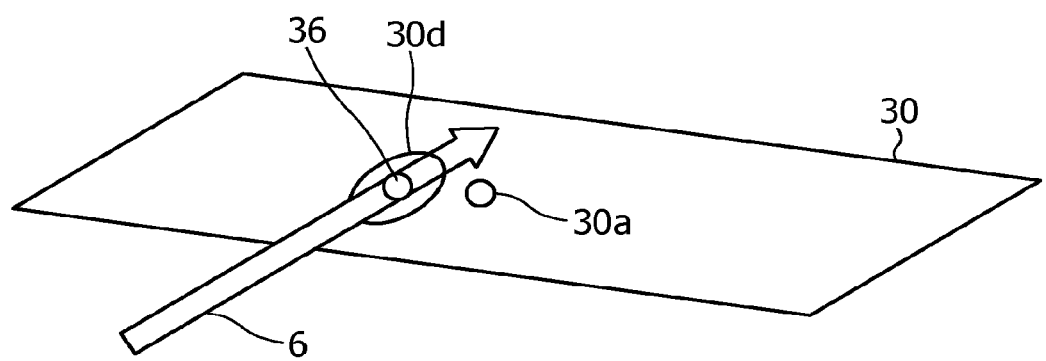
FIG. 16 is a view for describing an error range of a virtual object in the case where an angle formed by the line normal to an approximate plane and a line of sight is close to a right angle.

Subsequently, processing of the correction unit 311 in the case where the angle formed by the line normal to the approximate plane and the line of sight is close to a right angle is described. First, the error range of the virtual object in the case where the angle formed by the line normal to the approximate plane and the line of sight is close to a right angle is described. FIG. 16 is a view illustrating an error range of a virtual object in the case where an angle formed by the line normal to an approximate plane and a line of sight is close to a right angle. As illustrated in FIG. 16, when the angle formed by the line normal to the approximate plane 30 and the line of sight 6 is close to a right angle, an error range 30d is enlarged, compared to an error range 30b illustrated in FIG. 14. Therefore, if an intersection 36 of the line of sight 6 and the approximate plane 30 is specified as the three-dimensional coordinates of the virtual object, there is a case where the specified three-dimensional coordinates deviate from appropriate three-dimensional coordinates. The correction unit 311 performs the following processing in order to appropriately obtain the three-dimensional coordinates of the virtual object.

Figure 17:
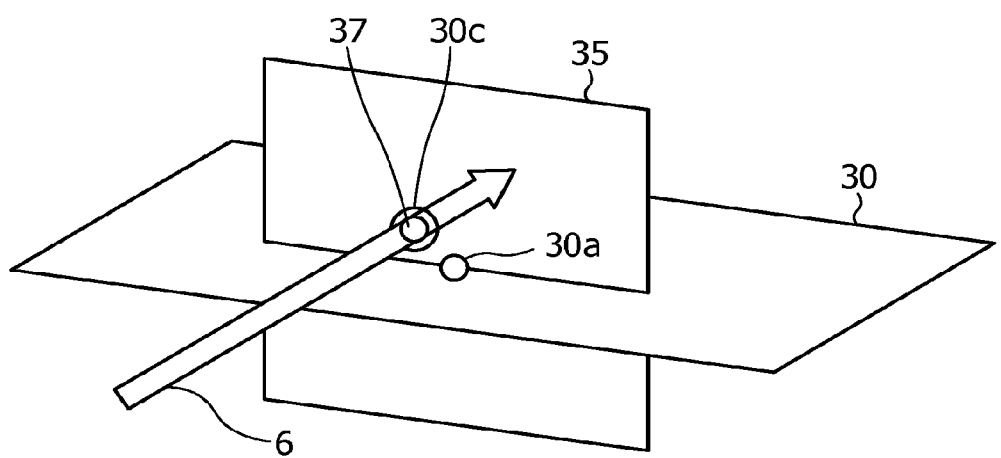
FIG. 17 is a view for describing processing of a correction unit according to Embodiment 3.

FIG. 17 is a view for describing processing of a correction unit according to Embodiment 3. The correction unit 311 specifies a perpendicular plane 35 that passes through the center of gravity 30a of the approximate plane 30 and is perpendicular to the approximate plane 30. The correction unit 311 specifies the intersection 37 of the specified perpendicular plane 35 and the line of sight 6 as the three-dimensional coordinates of the virtual object.

Figure 18:
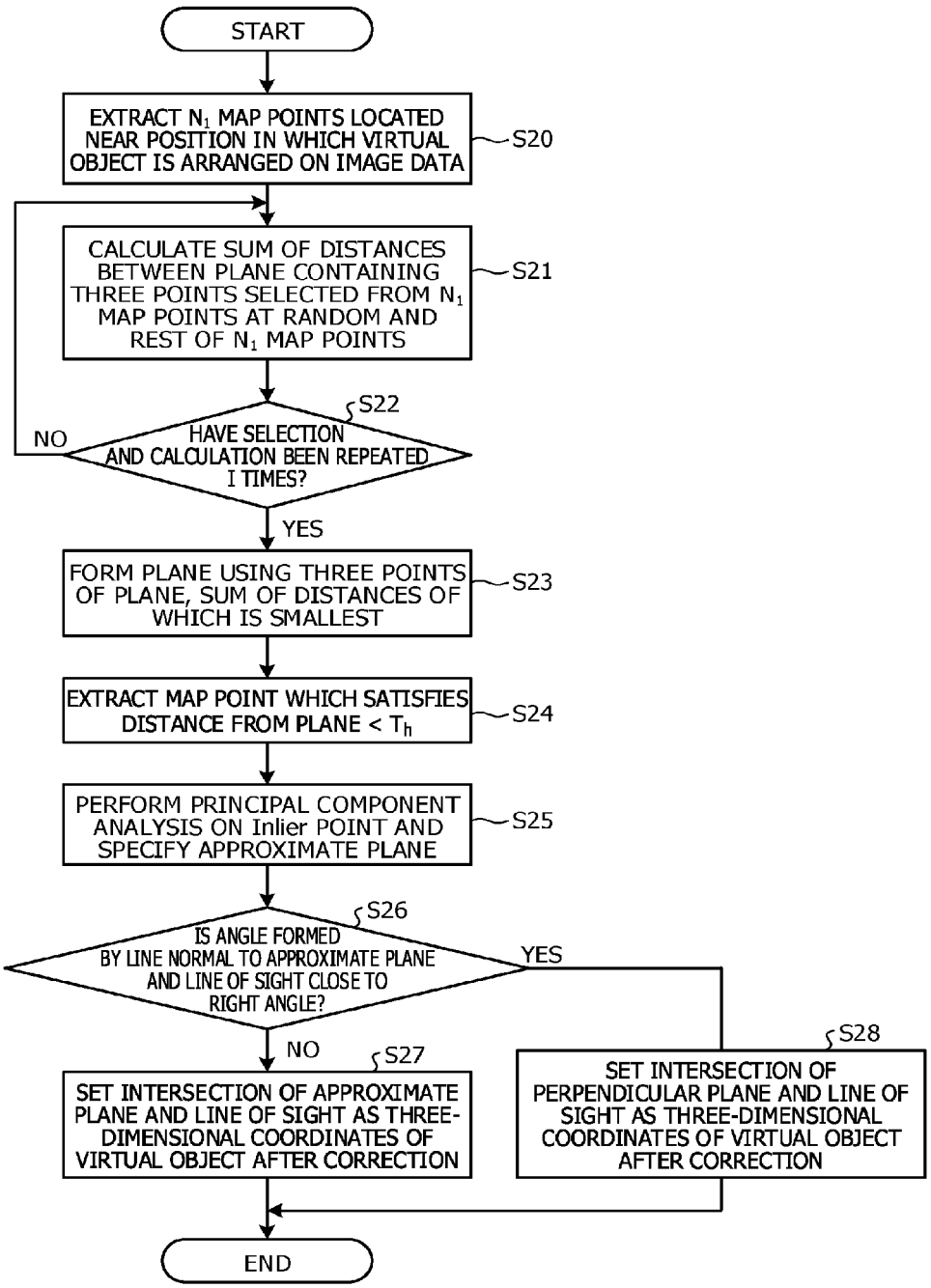
FIG. 18 is a flowchart illustrating processing procedures of the correction unit according to Embodiment 3.

Next, exemplary processing procedures of the correction unit 311 according to Embodiment 3 is described. FIG. 18 is a flowchart illustrating processing procedures of the correction unit according to Embodiment 3. As illustrated in FIG. 18, the correction unit 311 extracts $N_1$ map points located near the position in which the virtual object is arranged on the image data (Step S20). The correction unit 311 calculates the sum of distances between a plane including three points selected from the $N_1$ map points at random and the rest of the $N_1$ map points (Step S21).

The correction unit 311 determines whether or not the above-described selection and calculation have been repeated I times (Step S22). In the case where the above-described selection and calculation have not been repeated I times (NO in Step S22), the correction unit 311 causes the process to return to Step S21. In the case where the above-described selection and calculation have been repeated I times (YES in Step S22), the correction unit 311 forms a plane using three points of a plane, the sum of the distances of which is the smallest (Step S23).

The correction unit 311 extracts a map point which satisfies the distance from the plane<$T_h$ (Step S24). The map point extracted in Step S24 is described as an Inlier point and other map points than the Inlier point are described as Outlier points. The correction unit 311 specifies an approximate plane by performing principal component analysis on the Inlier point to perform plane approximation (Step S25).

The correction unit 311 determines whether or not an angle formed by the line normal to the approximate plane and a line of sight is close to a right angle (Step S26). In the case where the angle formed by the line normal to the approximate plane and the line of sight is not close to a right angle (NO in Step S26), the correction unit 311 causes the process to proceed to Step S27. In Step S27, the correction unit 311 sets the intersection of the approximate plane and the line of sight as the three-dimensional coordinates of the virtual object after correction (Step S27).

On the other hand, in the case where the angle formed by the line normal to the approximate plane and the line of sight is close to a right angle (YES in Step S26), the correction unit 311 causes the process to proceed to Step S28. In Step S28, the correction unit 311 sets the intersection of the perpendicular plane and the line of sight as the three-dimensional coordinates of the virtual object after correction (Step S28).

Next, advantages of the authoring device 300 according to Embodiment 3 are described. In the case where a map of the map information 122 is changed from a plane map to a stereoscopic map, the authoring device 300 corrects the coordinates of the virtual object, based on the stereoscopic map. For example, the correction unit 311 calculates the approximate plane of each of the map points $S_1'$ to $S_8'$ included in the stereoscopic map and calculates, in the case where the angle formed by the line normal to the approximate plane and the line of sight is not close to a right angle, the coordinates of the intersection of the approximate plane and the line of sight as the three-dimensional coordinates of the virtual object. On the other hand, in the case where the angle formed by the line normal to the approximate plane and the line of sight is close to a right angle, the correction unit 311 specifies, as illustrated in FIG. 17, the intersection 37 of the perpendicular plane 35 and the line of sight 6 as the three-dimensional coordinates of the virtual object.

By performing the above-described processing, the error range in the case where the perpendicular plane 35 is used is an error range 30c and, compared to the error range 30d illustrated in FIG. 16, the error range is small, and therefore, the three-dimensional coordinates of the virtual object may be accurately calculated.

[Embodiment 4]

Figure 19:
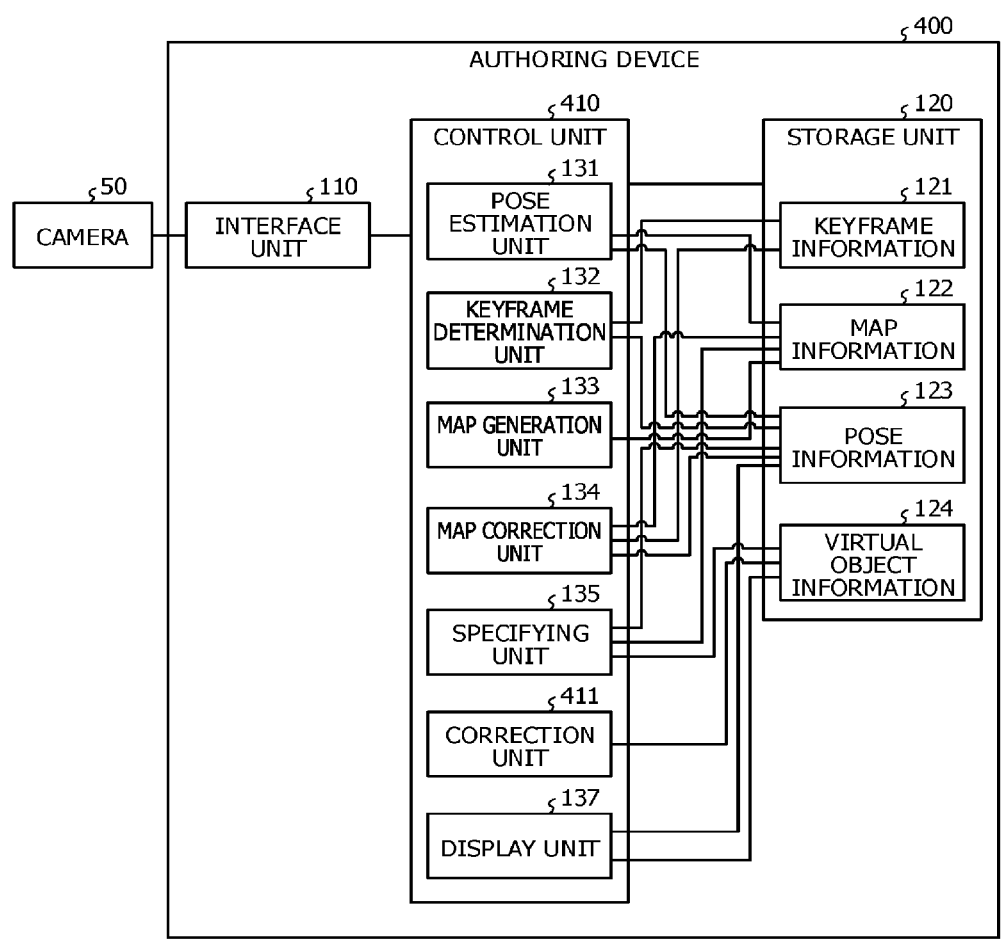
FIG. 19 is a diagram illustrating a configuration of an authoring device according to Embodiment 4.

FIG. 19 is a diagram illustrating a configuration of an authoring device according to Embodiment 4. As illustrated in FIG. 19, an authoring device 400 is coupled to a camera 50. The authoring device 400 includes an interface unit 110, a storage unit 120, and a control unit 410.

Similar description to the description of the camera 50 in Embodiment 1 applies to the camera 50. Also, similar description to the description of each of the interface unit 110 and the storage unit 120 in Embodiment 1 applies to the corresponding one of the interface unit 110 and the storage unit 120.

The control unit 410 includes a pose estimation unit 131, a keyframe determination unit 132, a map generation unit 133, a map correction unit 134, a specifying unit 135, a correction unit 411, and a display unit 137. The control unit 410 corresponds to an integrated device, such as, for example, an ASIC, an FPGA, or the like. Also, the control unit 410 corresponds to an electronic circuit, such as, for example, a CPU, an MPU, or the like.

Similar description to the description of each of the pose estimation unit 131, the keyframe determination unit 132, the map generation unit 133, the map correction unit 134, the specifying unit 135, and the display unit 137 in Embodiment 1 applies to the corresponding one of the processing units included in the control unit 410.

Prior to correction of the three-dimensional coordinates of the virtual object, the correction unit 411 determines whether or not correction of the three-dimensional coordinates of the virtual object is to be performed. For example, in the case where a first determination criterion or a second determination criterion, which is described below, is satisfied, the correction unit 411 determines that correction of the three-dimensional coordinates of the virtual object is not to be performed.

The first determination criterion is a reference indicating that a correction amount of the three-dimensional coordinates of a map point of the map information 122 is small. For example, the correction unit 411 calculates the center of gravity before correction, which indicates the center of gravity of the map point of the map information 122 before correction. The correction unit 411 calculates the center of gravity after correction, which indicates the center of gravity of the map point of the map information 122 after correction. In the case where a distance between the center of the gravity before correction and the center of gravity after correction is less than a first threshold, the correction unit 411 determines that the first determination criterion is satisfied.

For example, the correction unit 411 calculates the first threshold in accordance with "d×0.1". d is a value that corresponds to a distance by which the camera 50 has moved in successive keyframes.

A second determination criterion is a reference indicating that the density of map points of the three-dimensional coordinates of the virtual object is small. For example, the correction unit 411 refers to the map information 122 and measures the volume of a rectangular parallelepiped containing the three-dimensional coordinates of the virtual object and counts the number of map points included in the rectangular parallelepiped. In the case where a value obtained by dividing the number of map points included in the rectangular parallelepiped by the volume of the rectangular parallelepiped is less than a second threshold, the correction unit 411 determines that the second determination criterion is satisfied.

For example, the correction unit 411 calculates the second threshold in accordance with "1000/d^3". d is a value that corresponds to a distance by which the camera 50 has moved in successive keyframes.

In the case where it is determined that correction of the three-dimensional coordinates of the virtual object is to be performed, the correction unit 411 calculates the three-dimensional coordinates of the virtual object similarly to the correction units 136, 211, and 311, which have been described in Embodiments 1 to 3.

Figure 20:
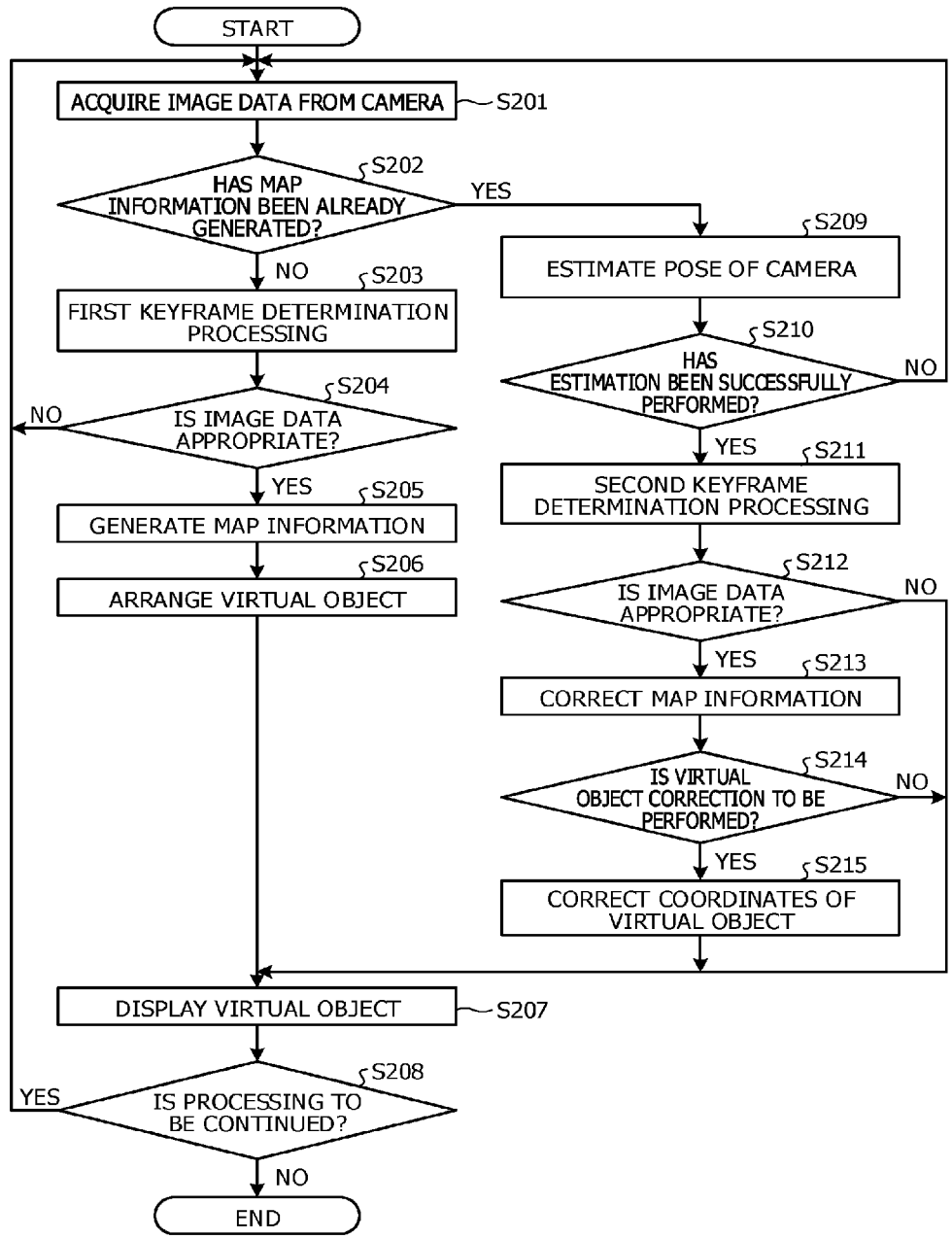
FIG. 20 is a flowchart illustrating processing procedures of the authoring device according to Embodiment 4.

Next, processing procedures of the authoring device 400 according to Embodiment 4 are described. FIG. 20 is a flowchart illustrating processing procedures of the authoring device according to Embodiment 4. As illustrated in FIG. 20, the authoring device 400 acquires image data from the camera 50 (Step S201).

The authoring device 400 determines whether or not the map information has been already generated (Step S202). In the case where the map information has not been generated (NO in Step S202), the keyframe determination unit 132 of the authoring device 400 executes the first keyframe determination processing (Step S203).

The keyframe determination unit 132 determines whether or not the image data is appropriate as a first keyframe (Step S204). In the case where the authoring device 400 determines that the image data is not appropriate as the first keyframe (NO in Step S204), the keyframe determination unit 132 causes the process to return to Step S201. On the other hand, in the case where the image data is appropriate as the first keyframe (YES in Step S204), the keyframe determination unit 132 causes the process to proceed to Step S205.

The map generation unit 133 of the authoring device 400 generates the map information 122 (Step S205). The specifying unit 135 of the authoring device 400 specifies the coordinates of a virtual object, and the display unit 137 arranges the virtual object (Step S206) and displays the virtual object (Step S207).

In the case where the processing is to be continued (YES in Step S208), the authoring device 400 causes the process to return to Step S201. On the other hand, in the case where the processing is not to be continued (NO in Step S208), the authoring device 400 terminates the processing.

Return to the description of Step S202 of FIG. 20. In the case where the map information 122 has been already generated (YES in Step S202), the authoring device 400 causes the process to proceed to Step S209. The pose estimation unit 131 of the authoring device 400 estimates the pose of the camera 50 (Step S209).

In the case where estimation of the pose has not been successfully performed (NO in Step S210), the pose estimation unit 131 causes the process to return to Step S201. In the case where estimation of the pose has been successfully performed (YES in Step S210), the pose estimation unit 131 causes the process to proceed to Step S211.

The keyframe determination unit 132 of the authoring device 400 executes the second keyframe determination processing (Step S211). In the case where image data is not appropriate as a second keyframe (NO in Step S212), the keyframe determination unit 132 causes the process to proceed to Step S207. On the other hand, in the case where image data is appropriate as a second keyframe (YES in Step S212), the keyframe determination unit 132 causes the process to proceed to Step S213.

The map correction unit 134 of the authoring device 400 corrects the map information 122 (Step S213). The correction unit 411 of the authoring device 400 determines whether or not virtual object correction is to be performed (Step S214). In the case where the correction unit 411 determines that virtual object correction is to be performed (YES in Step S214), the correction unit 411 corrects the coordinates of the virtual object (Step S215) and causes the process to proceed to Step S207. On the other hand, in the case where the correction unit 411 determines that virtual object correction is not to be performed (NO in Step S214), the correction unit 411 causes the process to proceed to Step S207.

Next, advantages of the authoring device 400 according to Embodiment 4 are described. In the case where the map information 122 is corrected, the authoring device 400 determines whether or not the first determination criterion or the second determination criterion is satisfied. Only in the case where neither the first determination criterion nor the second determination criterion is satisfied, the authoring device 400 corrects the three-dimensional coordinates of the virtual object. Here, in the case where the first determination criterion is satisfied, the amount of movement of a map point is small, and therefore, a display displacement of the virtual object is also small. In the case where the second determination criterion is satisfied, the number of maps is small, and even when a slight displacement of the position of the virtual object occurs, which target object the virtual object indicates may be easily determined. Therefore, the three-dimensional coordinates of the virtual object are corrected in the case where neither the first determination criterion nor the second determination criterion is satisfied, and thereby, a processing load of the above-described correction may be reduced.

Here, in Embodiments 1 to 4, the map correction unit 134 may be configured to correct the map information 122 by bundle adjustment which is described later, or correct the map information 122 by real-time correction. In addition, each of the correction units 136, 211, 311, and 411 described in Embodiments 1 to 4 above may be configured to correct the three-dimensional coordinates of the virtual object by bundle adjustment or real-time correction at the timing at which the map information 122 is corrected.

For example, the correction unit 136 calculates the center of gravity $S_G$ of each of the map points $S_1'$ to $S_8'$ of the map information 122 which has been bundle-adjusted or real-time corrected. The correction unit 136 calculates the three-dimensional coordinates of the foot A of the perpendicular line 5c extending downward from the center of gravity $S_G$ to the line of sight 6 as the three-dimensional coordinates of the virtual object 5a after correction.

The correction unit 211 calculates an approximate plane of each of the map points $S_1'$ to $S_8'$ of the map information 122 which has been bundle-adjusted or real-time corrected and calculates the coordinates of the intersection of the approximate plane and the line of sight as the three-dimensional coordinates of the virtual object.

The correction unit 311 calculates an approximate plane of each of the map points $S_1'$ to $S_8'$ of the map information 122 which has been bundle-adjusted or real-time corrected. In the case where the angle of the line normal to the approximate plane and the line of sight is not close to a right angle, the correction unit 311 executes similar processing to the processing of the correction unit 211. In the case where the angle of the line normal to the approximate plane and the line of sight is close to a right angle, the correction unit 311 specifies a perpendicular plane that passes through the center of gravity of the approximate plane and is perpendicular to the approximate plane. The correction unit 311 specifies the intersection of the specified vertical plane and the line of sight as the three-dimensional coordinates of the virtual object.

Subsequently, exemplary bundle adjustment that is executed by the map correction unit 134 is described. The map correction unit 134 refers to the keyframe information 121 and, in the case where five or more keyframes are registered in the keyframe information 121, performs bundle adjustment.

Bundle adjustment is processing in which, using a map point, a feature point in the image data, and the positions and attitudes of a plurality of keyframes, the three-dimensional coordinates of the map point and the positions and attitudes of the keyframes are finely adjusted such that a reprojection error is the smallest. For example, the contents of processing of bundle adjustment are described in B. Triggs et al., "Bundle Adjustment A Modern Synthesis", Vision Algorithms: Theory and Practice, LNCS, Springer Verlag, 2000, or the like.

Exemplary real-time correction that is executed by the map correction unit 134 is described. The map correction unit 134 obtains the coordinates of a projection point $(x_i, y_i)$ in which a map point is projected on image data, using the pose of the camera 50. The map correction unit 134 performs matching of the projection point $(x_i, y_i)$ and a feature point $(u_i, v_i)$ in the image data. The map correction unit 134 adjusts the three-dimensional coordinates of the map point, using a least-squares method or the like, such that an error $E_i$ between the projection point and the feature point that have been matched is small. The error $E_i$ is defined by, for example, Expression 5.

$$E_i = (x_i - u_i)^2 + (y_i - v_i)^2 \tag{5}$$

Figure 21:
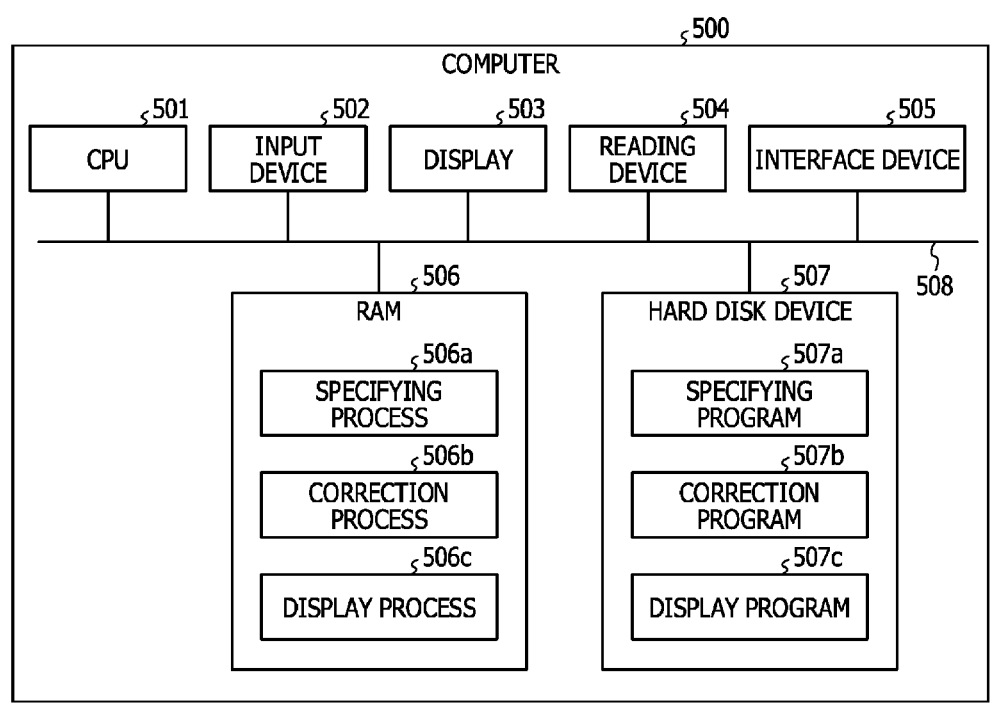
FIG. 21 is a diagram illustrating an exemplary hardware configuration of an authoring device.

Next, an exemplary hardware configuration of the authoring devices 100, 200, 300, and 400 described in Embodiments above will be described. FIG. 21 is a diagram illustrating an exemplary hardware configuration of an authoring device.

As illustrated in FIG. 21, a computer 500 includes a CPU 501 that executes various types of arithmetic processing, an input device 502 that receives an input of data from a user, and a display 503. The computer 500 further includes a reading device 504 that reads a program or the like from a storage medium and an interface device 505 that transmits and receives data to and from another computer via a network. The computer 500 further includes RAM 506 that temporarily stores various types of information and a hard disk drive 507. Each of the devices 501 to 507 is coupled to a bus 508.

The hard disk drive 507 includes a specifying program 507a, a correction program 507b, and a display program 507c. The CPU 501 reads each of the programs 507a to 507c and develops the program on the RAM 506. The specifying program 507a functions as a specifying process 506a. The correction program 507b functions as a correction process 506b. The display program 507c functions as a display process 506c.

For example, processing of the specifying process 506a corresponds to processing of the specifying unit 135. Processing of the correction process 506b corresponds to processing of each of the correction units 136, 211, 311, and 411. Processing of the display process 506c corresponds to processing of the display unit 137.

Note that there may be a case where each of the programs 507a to 507c is not initially stored in the hard disk drive 507. For example, each program is stored in advance in a "portable physical medium", such as a flexible disk (FD), CD-ROM, a DVD disk, a magneto-optical disk, an IC card, or the like, which is inserted to the computer 500. The computer 500 may read each of the programs 507a to 507c from the portable physical medium and execute each of the read programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a computer, the method comprising:
    specifying a position of a virtual object based on a position of a map point that is defined in a first map and indicates three-dimensional coordinates of a feature point;
    calculating a center of gravity of a plurality of map defined in a second map;
    calculating a first intersection of a capturing direction of a camera and an approximate plane when the first map is changed to the second map, the approximate plane being a plane which passes through the center of gravity of the plurality of map points defined in the second map and is perpendicular to the capturing direction;

correcting the position of the virtual object based on the calculated first intersection; and controlling a display to display the virtual object, based on the corrected position of the virtual object and an image captured by the camera.

2. The method according to claim 1, wherein the correcting includes:

correcting the position of the virtual object to a position of the first intersection.

3. The method according to claim 1, further comprising:

determining whether an angle formed by a line normal to the approximate plane and the capturing direction is close to a right angle, wherein the calculating, the correcting, and the controlling are executed when the angle is not close to a right angle, and wherein the method includes another calculating a second intersection of the capturing direction and a plane that passes through a center of gravity of the approximate plane and is perpendicular to the approximate plane when the angle formed by a line normal to the approximate plane and the capturing direction is close to a right angle, and another correcting the position of the virtual object to a position of the second intersection.

4. The method according to claim 1, wherein the correcting includes determining whether the position of the virtual object is to be corrected based on an error between a position of a first map point of the first map and a second position of a second map point of the second map, and the first map point and the second map point are corresponding each other and located around the position of the virtual object.

5. The method according to claim 1, wherein the correcting includes determining whether the position of the virtual object is to be corrected, based on a density of map points of the first map, which is located around the position of the virtual object.

6. The method according to claim 1, further comprising:

determining a plurality of keyframes from among frames photographed by the camera, the plurality of keyframes including a first keyframe and a second keyframe that follows the first keyframe; and generating the second map, based on the first keyframe and the second keyframe.

7. The method according to claim 1, further comprising:

determining a plurality of keyframes from among frames photographed by the camera; and generating the second map, based on the plurality of keyframes, by bundle adjustment.

8. The method according to claim 1, further comprising:

determining a keyframe from among frames photographed by the camera; and generating the second map by finely adjusting a position of a map point of the first map based on the keyframe and a frame from among the frames which follows the keyframe.

9. A non-transitory computer-readable storage medium storing a program that causes a computer to execute a process, the process comprising:

specifying a position of a virtual object based on a position of a map point that is defined in a first map and indicates three-dimensional coordinates of a feature point;

calculating a center of gravity of a plurality of map points defined in a second map;

calculating a first intersection of a capturing direction of a camera and an approximate plane when the first map is changed to the second map, the approximate plane being a plane which passes through the center of gravity of the plurality of map points defined in the second map and is perpendicular to the capturing direction;

correcting the position of the virtual object based on the calculated first intersection; and controlling a display to display the virtual object, based on the corrected position of the virtual object and an image captured by the camera.

10. A device comprising:

a memory; and a processor coupled to the memory and configured to:

specify a position of a virtual object based on a position of a map point that is defined in a first map and indicates three-dimensional coordinates of a feature point, calculate a center of gravity of a plurality of map points defined in a second map, calculate a first intersection of a capturing direction of a camera and an approximate plane when the first map is changed to the second map, the approximate plane being a plane which passes through the center of gravity of the plurality of map points defined in the second map and is perpendicular to the capturing direction, correct the position of the virtual object based on the calculated first intersection, and control a display to display the virtual object, based on the corrected position of the virtual object and an image captured by the camera.

11. The device according to claim 10, wherein the correcting includes correcting the position of the virtual object to a position of the first intersection.

12. The device according to claim 11, wherein the processor is configured to:

determine whether an angle formed by a line normal to the approximate plane and the capturing direction is close to a right angle, wherein the processor performs the calculating, the correcting, and the controlling steps when the angle is not close to a right angle, and the processor is further configured to calculate a second intersection of the capturing direction and a plane that passes through a center of gravity of the approximate plane and is perpendicular to the approximate plane when the angle is close to a right angle, and the processor is further configured to correct the position of the virtual object to a position of the second intersection.

13. The device according to claim 10, wherein the processor is configured to determine whether the position of the virtual object is to be corrected based on an error between a position of a first map point of the first map and a second position of a second map point of the second map, and the first map point and the second map point are corresponding each other and located around the position of the virtual object.

14. The device according to claim 10, wherein the processor is configured to determine whether the position of the virtual object is to be corrected, based on a density of map points of the first map, which is located around the position of the virtual object.

15. The device according to claim 10, wherein the processor is configured to:
   determine a plurality of keyframes from among frames photographed by the camera, the plurality of keyframes including a first keyframe and a second keyframe that follows the first keyframe, and
   generate the second map, based on the first keyframe and the second keyframe.

16. The device according to claim 10, wherein the processor is configured to:
   determine a plurality of keyframes from among frames photographed by the camera, and
   generate the second map, based on the plurality of keyframes, by bundle adjustment.

17. The device according to claim 10, wherein the processor is configured to:
   determine a keyframe from among frames photographed by the camera, and
   generate the second map by finely adjusting a position of a map point of the first map based on the keyframe and a frame from among the frames which follows the keyframe.

\* \* \* \* \*